INVENTOR.
Cecil E. Webb.
BY
Wood, Herron & Evans.
ATTORNEYS.

July 19, 1955

C. E. WEBB 2,713,189

AUTOMATIC APPARATUS FOR FINISHING
THE ENDS OF TILE SECTIONS

Filed July 21, 1951

INVENTOR.
Cecil E. Webb.
BY
Wood, Herron & Evans.
ATTORNEYS.

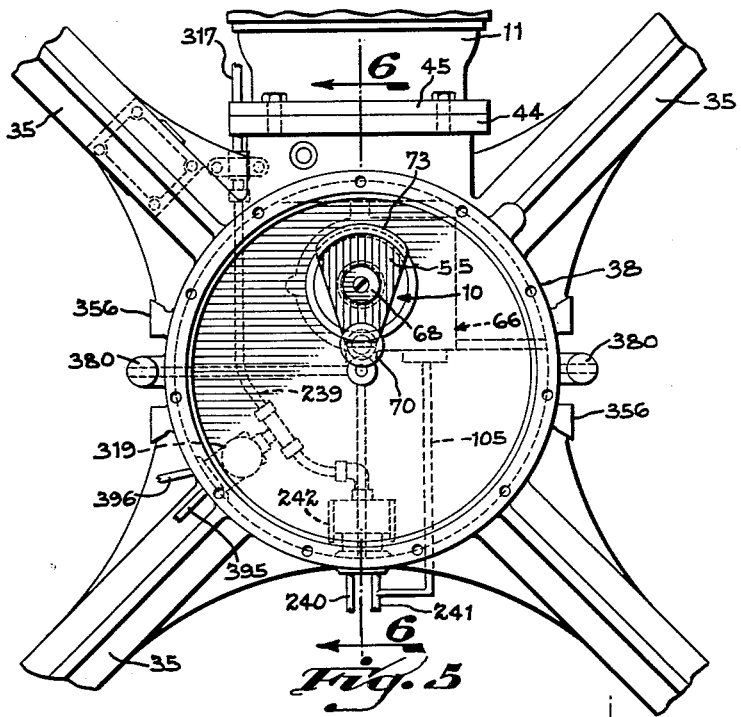
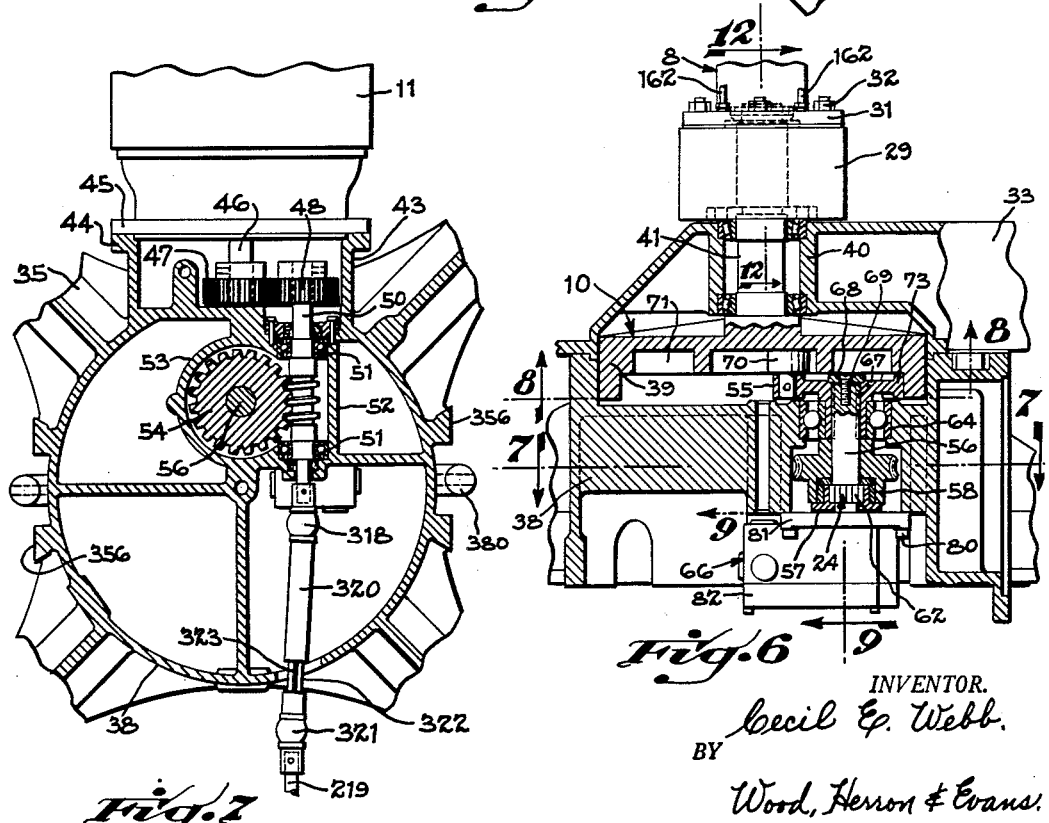

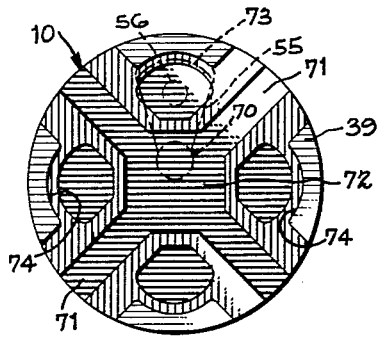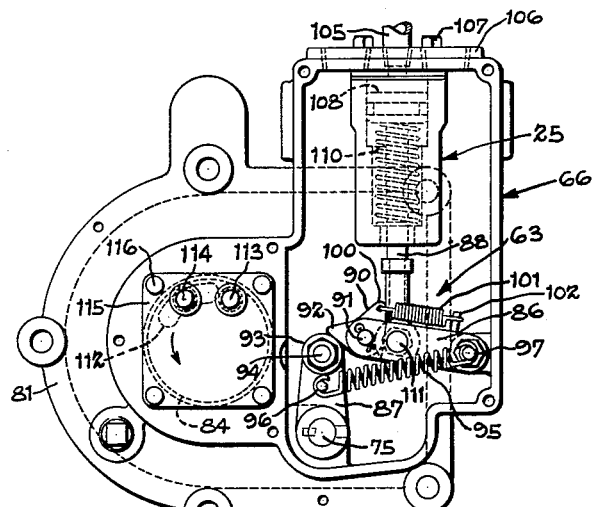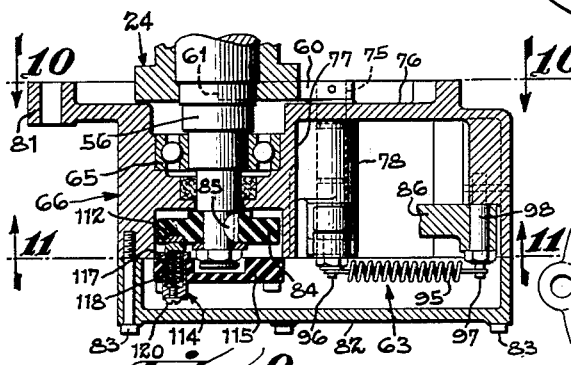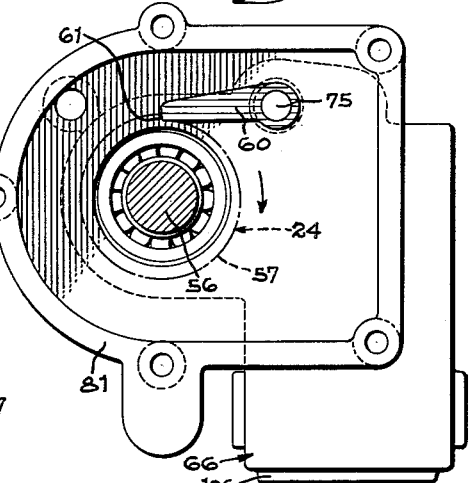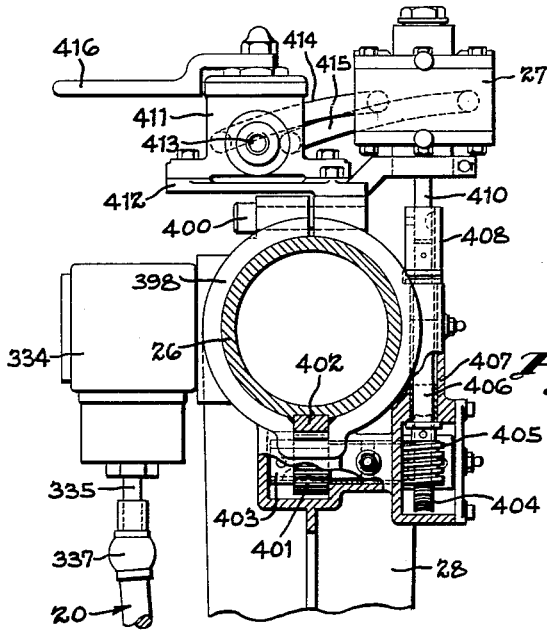

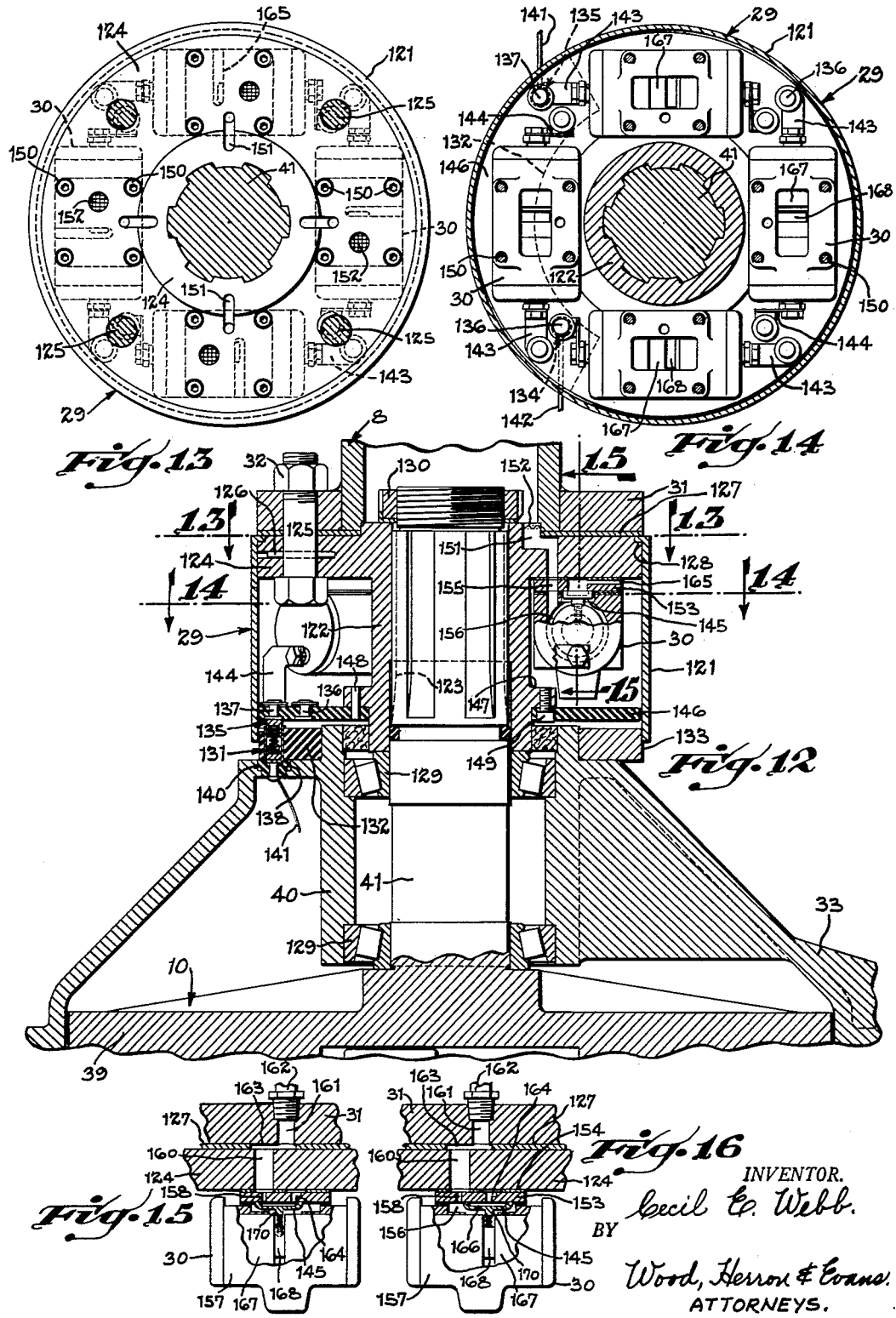

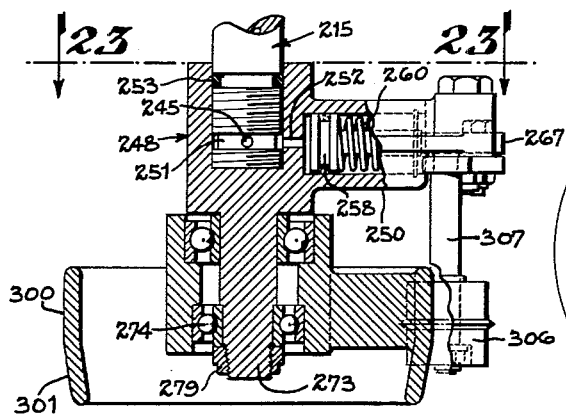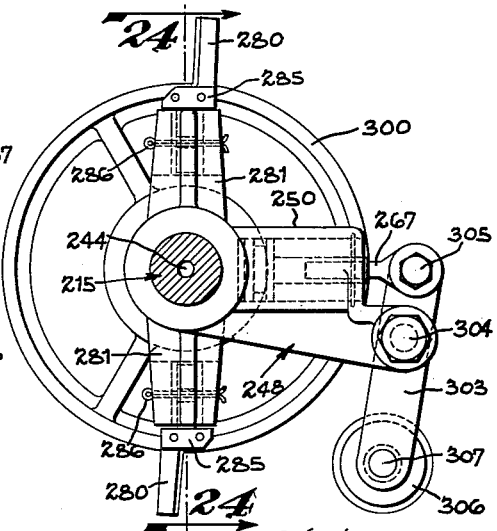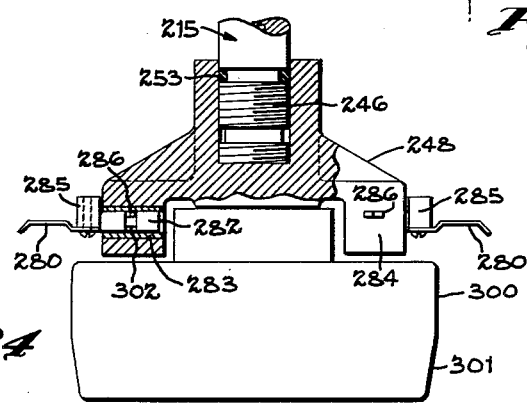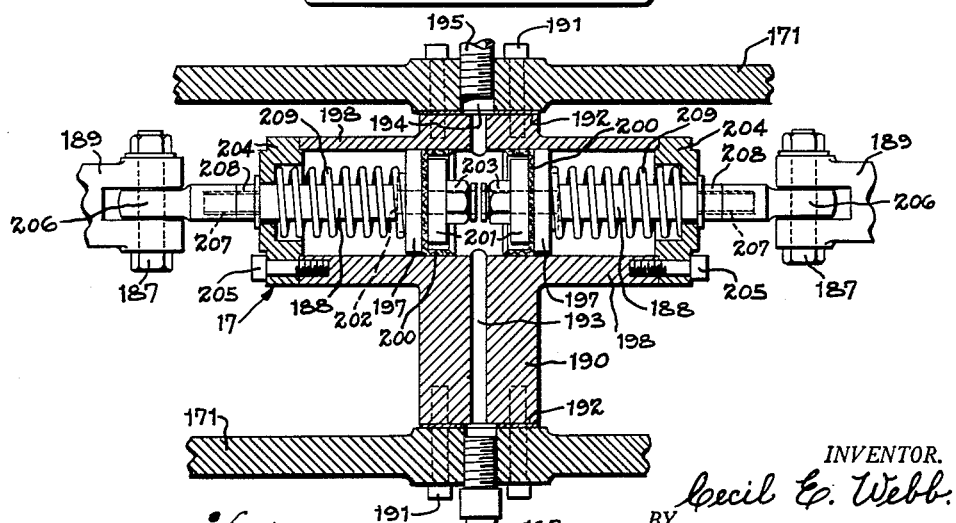

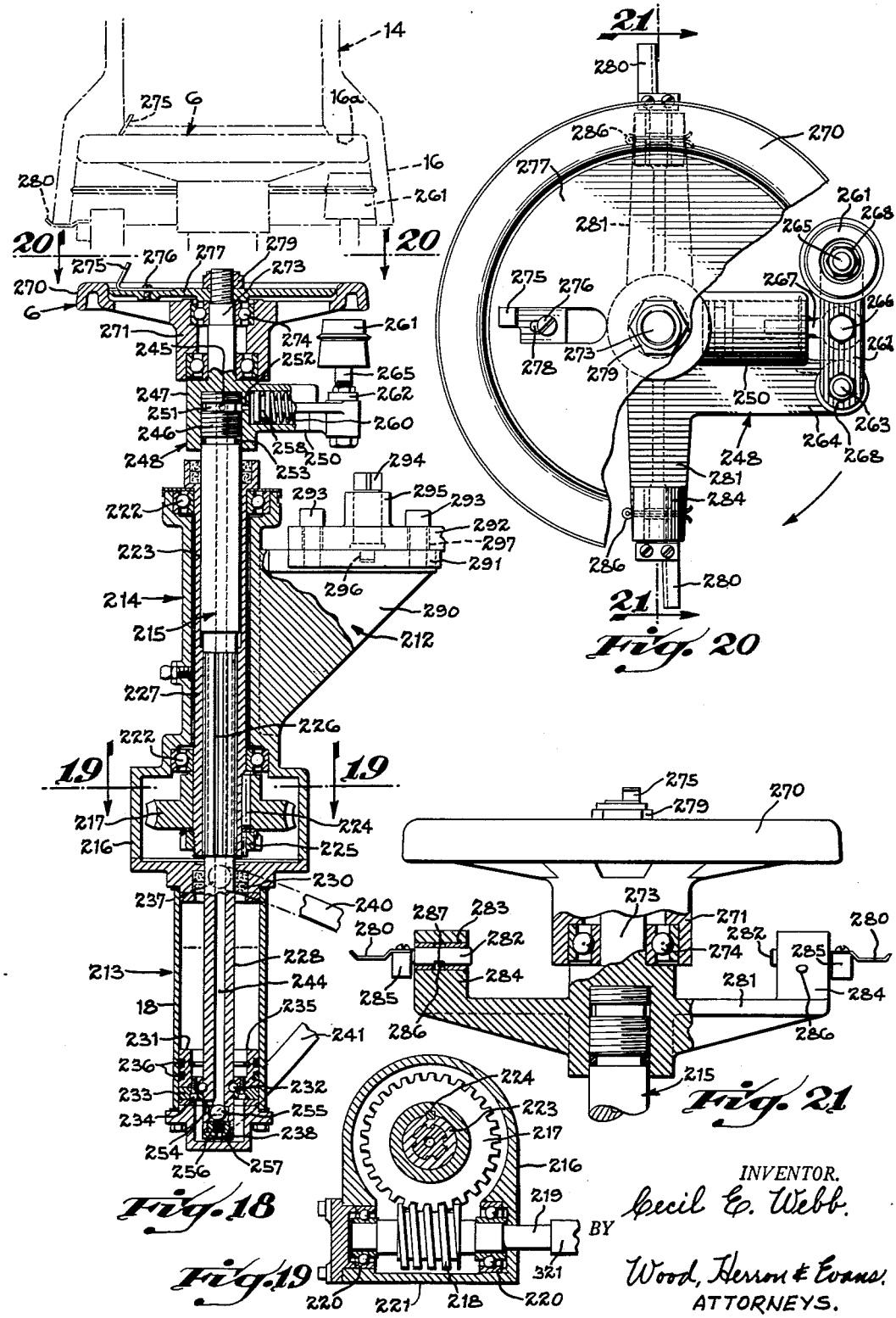

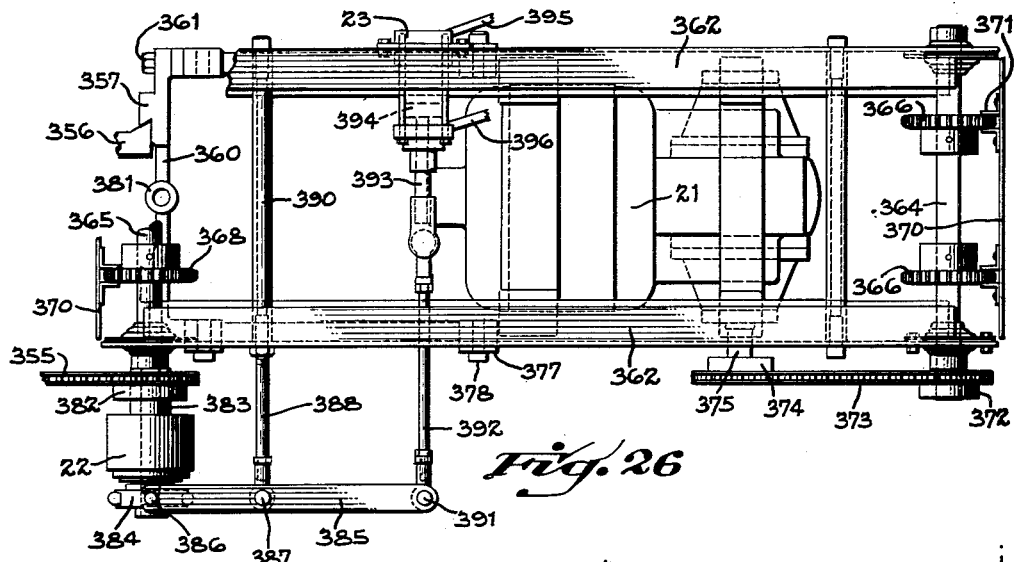

INVENTOR.
Cecil E. Webb.
BY Wood, Herron & Evans.
ATTORNEYS.

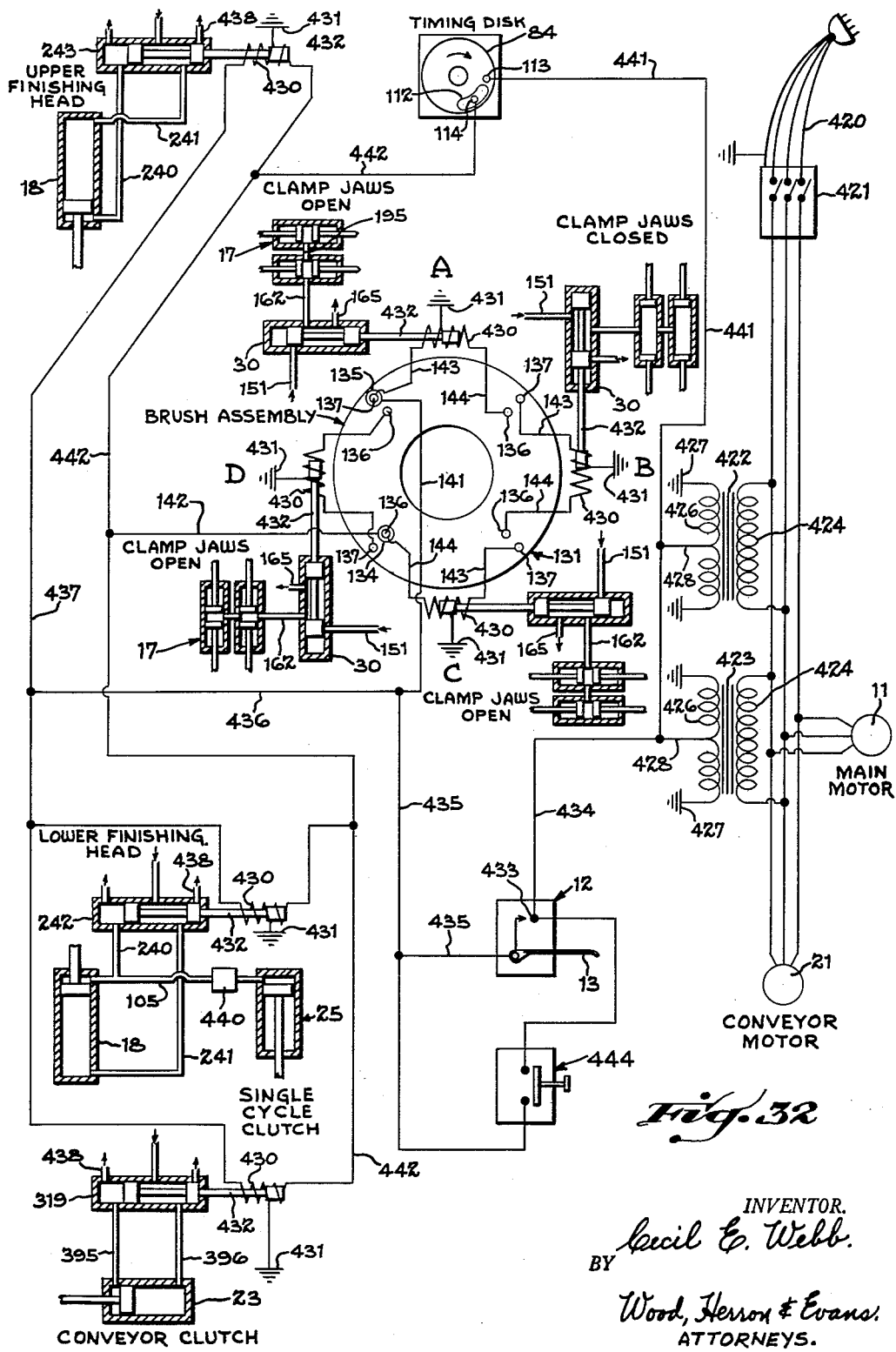

2,713,189

AUTOMATIC APPARATUS FOR FINISHING THE ENDS OF TILE SECTIONS

Cecil E. Webb, Cincinnati, Ohio, assignor to M. S. Bowne, Clearfield, Ky., as trustee Application July 21, 1951, Serial No. 237,920

39 Claims. (Cl. 25—105)

This invention pertains to the manufacture of ceramic pipe such as sewer pipe sections, drainage tiles and the like which are formed of plastic clay and hardened by firing. The invention relates particularly to an apparatus for the rapid, automatic execution of precision finishing operations upon the ends of the pipe sections while they are in the plastic state.

A typical sewer pipe section consists of a cylindrical column having at one end an enlarged coupling hub adapted to establish a telescopic connection with the column end of an adjoining pipe section when the sections are connected to one another to make up drainage or waste lines. The tile pipe sections are usually fabricated by extruding the cylindrical column, then expanding one end of it to form the coupling hub, the hub being formed by suitable dies either in conjunction with the extrusion process or with a separate operation. The inside diameter of the hub is made sufficiently larger than the column to provide an annular space between two sections when they are telescoped together, and upon installation, this space is packed with wet cement or equivalent material to provide a seal between the connected pipe sections. An internal shoulder, which is formed at the juncture of the inside diameters of the hub and column, forms an abutment for the column end upon insertion into the hub.

The present finishing apparatus is disclosed in connection with this type of tile pipe as a preferred form of the invention and is adapted to finish both the hub and spigot ends concurrently. However, it will be understood that the invention is not limited in its application to this particular type but can be used in finishing one or both ends of tile sections having plain ends or in finishing others having special formations at one or both ends. It will also be understood that the operating principles disclosed herein in relation to plastic clay can be applied to the production of tubes formed of other plastic materials having similar characteristics.

In the sewer pipe industry, the cylindrical column is usually designated as the spigot end and the tile sewer pipes are manufactured in various standard diameters and in various standard spigot and hub lengths. The diameters of the spigot and hub are held to close limits by the extrusion and forming dies but the length of the spigot and hub cannot be controlled precisely during the forming operations; therefore, it has been the practice in the industry to extrude the sections in lengths greater than the desired finished length of the product and while the extruded sections are still in plastic condition, to trim and finish them to their final dimensions.

Along with the final trimming operation, annular grooves are formed upon the outside diameter of the spigot end and corresponding annular grooves are formed in the inside diameter of the coupling hub to key the coupled sections permanently together when the wet cement hardens in the annular space. In addition to the grooving operation, it is customary to chamfer the corner of the internal shoulder which is formed at the juncture between the inside diameter of the hub and spigot. The purpose of the chamfer is to remove the flashing which is usually present at this point. This flashing is found in most of the extruded tiles, being formed by leakage of plastic clay under pressure between the interfaces of the dies during the forming of the hub.

The trimming, grooving and chamfering operations formerly were executed by hand. More recently, the present inventor developed an apparatus and method for performing these operations mechanically as disclosed in the copending application of Cecil E. Webb, Serial No. 111,182 filed August 19, 1949, now Patent No. 2,630,613. This prior machine is presently in successful operation as a hand fed machine and includes a pair of finishing heads which are generally similar to those of the present machine. Individual tiles are placed by hand in the machine, the machine being provided with means for guiding and sustaining the tiles in finishing position. Upon placement of the tiles, the finishing heads move axially into the opposite ends of the tile and rotate in opposite directions to perform operation.

In another copending application of Cecil E. Webb, Serial No. 148,593, filed March 9, 1950, there is disclosed an apparatus for inverting tile sections. This apparatus is arranged, as part of a production line, to turn the plastic tiles end over end as they are advanced along a conveyor. It embodies a rotatable turret having air operated clamp jaws which grip the tile and invert it upon cyclic rotation of the turret.

The present machine includes a rotatable turret having clamping jaws of construction similar to the invertor. These jaws cooperate with finishing heads similar, as above noted, to those of the finishing machine. Therefore, in respect to the finishing heads, and turret having air operated jaws, the present application is a continuation in part of both of the copending applications.

A primary object of the present invention has been to provide a structure which is completely automatic in operation as distinguished from the prior hand fed machine, such that the unfinished tiles issuing from a pipe forming machine, may be placed in vertical position upon a conveyor to be finished automatically at a rapid production rate as they are advanced at random sequence to the machine. This eliminates completely the handling of the tile sections incident to feeding them manually to and from the machine as formerly practiced, and by virtue of its completely automatic operation, increases the rate of production far beyond that of the manually fed machine.

In the present disclosure, the finishing heads are arranged to finish the tiles with the coupling hub down so that they are advanced with the hub resting upon the conveyor and bearing the weight of the tiles. This is preferable since they issue from the forming machine in this position. However, as noted in the copending invertor application, the larger tile sizes are too heavy to be supported upon their hubs; for this reason they are placed on socket boards which engage the shoulder in the hub and relieve the hub of the tile weight.

For a production run of these large tiles, the present machine may be installed along the production line following the invertor so that the tiles are resting upon their spigot ends instead of their hub ends as disclosed. As explained later, the finishing heads are interchangeable so that it is an easy matter to transpose their positions, to accommodate the larger tile sizes which are advanced with the hub up. The present machine therefore may be placed in the production line following the forming machine in finishing the smaller tiles or it may be placed in a position following an invertor in finishing inverted tiles.

Briefly, the present automatic finishing machine includes a revolving turret having radially extended tile clamping jaws which are indexed stepwise in a horizontal plane, a feed conveyor which advances the unfinished tiles to a position to be picked up by the clamping jaws, a pair of axially movable rotary finishing heads which enter the respective opposite ends of the tile section as it is indexed from the feed conveyor, and a discharge conveyor diametrically opposite the feed conveyor adapted to discharge the finished tiles as they are indexed from the finishing heads by the jaws.

These components are operated by fluid pressure, preferably air, and are arranged to execute one cycle of operation in response to the advancement to the turret of each individual tile. Upon initiation of the cycle, the feed conveyor is immediately stopped, the jaws close upon the tile section resting upon the feed conveyor, the finishing heads retract from the last finished tile, and the turret indexes. This transfers the unfinished tile from the feed conveyor to the finishing heads and simultaneously transfers the previously finished tile from the finishing heads to the discharge conveyor for release. After the tile is transferred to the rotating finishing heads, they move axially into its ends to execute the operation; near the end of the cycle, the feed conveyor is restarted and the jaws at the discharge station open to allow the previously finished tile to be carried away upon the discharge conveyor. The operations are controlled in sequence by a cycle control system which is energized by a starting switch located in the path of the advancing tiles so that the operations of the machine respond directly to the random advancement of unfinished tiles.

Another feature of the invention resides in a simple control system which operates in conjunction with the stepwise indexing of the turret to regulate the several operations in proper sequence each time the starting switch is tripped by an advancing tile. The clamping jaws are actuated by air cylinders and the control system consists essentially of an arrangement of electrical contactors connected to electrically operated valves which control the admission and release of pressure to the air operated jaws. The contactors are arranged to operate the clamping jaws according to the position of the turret. The driving mechanism for the turret is controlled by an air operated single cycle clutch, the feed conveyor is controlled by an air operated conveyor clutch, and the axial movements of the finishing heads are also air operated. These cylinders are also controlled by electrically operated valves and the valves are enegized by the control system in such a way that the several operations previously outlined occur at properly timed sequence after the cycle is initiated.

In a production machine of the present class, it is necessary to adapt the machine to finish tiles to selected hub lengths and spigot lengths. Therefore, another feature of the invention is embraced in an arrangement whereby the machine may be adjusted quickly to vary these dimensions so as to allow the machine to finish production runs of various selected tile sizes. It has been determined that the length of the hub (or spigot, if the tile is inverted) can be controlled and varied by changing the elevation of the conveyors with respect to the plane of lower finishing head which operates at a fixed plane. For this purpose the feed and discharge conveyors are self-contained units mounted upon the base of the machine and adjustable vertically relative to the lower finishing head. By changing the elevation of the conveyors, the length of the hub will be varied a like amount because the tile is carried at its adjusted elevation by the clamping jaws to the lower finishing head.

The length of the upper end is controlled by adjusting the elevation of the upper finishing head relative to the clamping jaws. For this purpose the machine includes a cross arm slidably mounted upon a column and adjustable vertically by means of an air motor. The cross arm and air motor also serve as a crane in servicing the machine as explained later.

Another aspect of the invention relates to a novel arrangement for quickly accommodating the machine to various tile diameters. For this purpose, the turret, including the clamping jaws and air supply system, constitutes a self-contained unit and is arranged to be demounted without uncoupling of air conduits or electrical wiring. The machine is supplied with interchangeable turret assemblies, each having clamping jaws suitable to clamp the several standard tile diameters. Finishing heads of corresponding diameters are furnished in sets with each turret assembly, the finishing heads likewise being demountable conveniently for interchange with the turret assemblies.

In order to facilitate the interchange of turret assemblies, the machine includes a base having a rotary indexing hub arranged to provide a detachable mounting for the indexing turret. The hub includes indexing mechanism and the electrically operated valves for the clamping jaws and their electrical contacts are within the hub. Air pressure is maintained within the turret column and matching air passageways are formed in the hub and column base to provide communication from the interior of the column through the valves and by way of supply conduits to the jaw clamping cylinders. This arrangement allows the turret to be removed and interchanged simply by removing a series of nuts securing the base of the turret to the indexing hub without disturbing any of the electrical components or valves.

As indicated above, the cross arm and air motor provides length adjustment and has double utility as a crane for elevating and shifting the turret for diameter adjustment. Thus, the turrets may be interchanged in the shop without the use of special equipment. The machine base includes a main column, and the cross arm, which carries the upper finishing head, is slidable vertically upon the main column by operation of the air motor. The cross arm may be elevated sufficiently to lift the turret from its hub and the arm, with the turret suspended from it may be swung radially to a position clear of the base and lowered to the ground. The arm is then utilized as a crane to install the replacement turret upon the hub.

As above indicated, the turret column constitutes an air reservoir or accumulator to supply air by way of the valves to the clamping jaw cylinders. This provides an accelerated clamping action since the reservoir eliminates the drop in line pressure which would normally take place upon the simultaneous operation of the several jaws. Thus, the self-contained turret assembly provides convenience interchange of turrets by cooperation with the self-contained control system and also speeds up the cycles of operation.

Various additional features and advantages of the invention will be more fully apparent to those skilled in the art from the following detailed description in conjunction with the accompanying drawings which illustrate a preferred embodiment of the invention.

In the drawings:

Figure 5 is an enlarged fragmentary top plan view of the lower base section, illustrating the general arrangement and location of the Geneva drive mechanism.

Figure 6 is a fragmentary sectional view taken through the base of the machine on line 6—6, Figure 5, detailing the Geneva mechanism and a portion of the drive and single cycle control clutch which regulates the indexing movements of the turret.

Figure 7 is a sectional view taken on line 7—7, Figure 6 further detailing the drive from the main motor to the Geneva mechanism.

Figure 8 is a face view of the Geneva wheel as removed from the machine and viewed along the line 8—8 in Figure 6.

Figure 9 is an enlarged fragmentary sectional view through the housing of the single cycle clutch mechanism taken on line 9—9 of Figure 6, with the housing removed from the base of the machine.

Figure 10 is a top view taken along line 10—10 of Figure 9, further detailing the clutch finger and control ring of the single cycle clutch.

Figure 11 is a bottom view taken along line 11—11, Figure 9, illustrating the tripping mechanism for the single cycle clutch, with the lower cover plate removed from the housing.

Figure 12 is an enlarged fragmentary sectional view, taken on line 12—12, Figure 6, detailing the indexing hub structure.

Figure 13 is a general view illustrating the arrangement of the electrically operated valves and air supply system in the indexing hub as viewed along line 13—13 of Figure 12.

Figure 14 is a view similar to Figure 13, taken on line 14—14, Figure 12, illustrating the arrangement of the electrically operated valves and brush assembly for energizing them.

Figure 15 is a fragmentary sectional view taken on line 15—15, Figure 12, illustrating one of the valves, the slide block, valve ports, and air passageways leading from turret column through the valve to the conduit leading to the clamp actuating cylinders. The valve slide in this view is shown in the exhaust position, corresponding to the open position of the clamping jaws.

Figure 16 is a view similar to Figure 15 showing the valve slide shifted to its second position or clamp closing position.

Figure 17 is an enlarged sectional view taken on line 17—17, Figure 1, detailing the construction of one of the clamp actuating cylinder assemblies.

Figure 18 is an enlarged fragmentary sectional view taken on line 18—18, Figure 1, detailing the lower finishing head assembly.

Figure 19 is a sectional view taken on line 19—19 Figure 18 detailing the gear box for rotating the finishing head.

Figure 20 is an enlarged top plan view as viewed along the line 20—20 of Figure 18, partially broken away showing the arrangement of the pedestal, trimming knives and scoring roller.

Figure 21 is a fragmentary sectional view taken on line 21—21 of Figure 20, further detailing the finishing head.

Figure 22 is an enlarged fragmentary sectional view detailing a portion of the upper finishing head as taken along line 22—22 of Figure 2.

Figure 23 is a plan view taken along line 23—23, Figure 22, further detailing the upper finishing head.

Figure 24 is a fragmentary sectional view taken on line 24—24 of Figure 23, detailing the mounting of the mandrel and trimming knives.

Figure 25 is a side elevation of the discharge conveyor assembly as viewed along line 25—25 of Figure 3.

Figure 26 is a top plan view of the discharge conveyor assembly as projected from Figure 25.

Figure 27 is an end view of the conveyor assembly as viewed along the line 27—27 of Figure 25.

Figure 28 is a detail view illustrating the air motor and drive for raising and lowering the cross arm, taken on line 28—28, Figure 2.

Figure 32 is a diagram of the control system showing the electrical circuit, valves and cylinders for the several components of the machine in the position they assume at the beginning of the cycle.

*General arrangement and operation*

Figure 1:
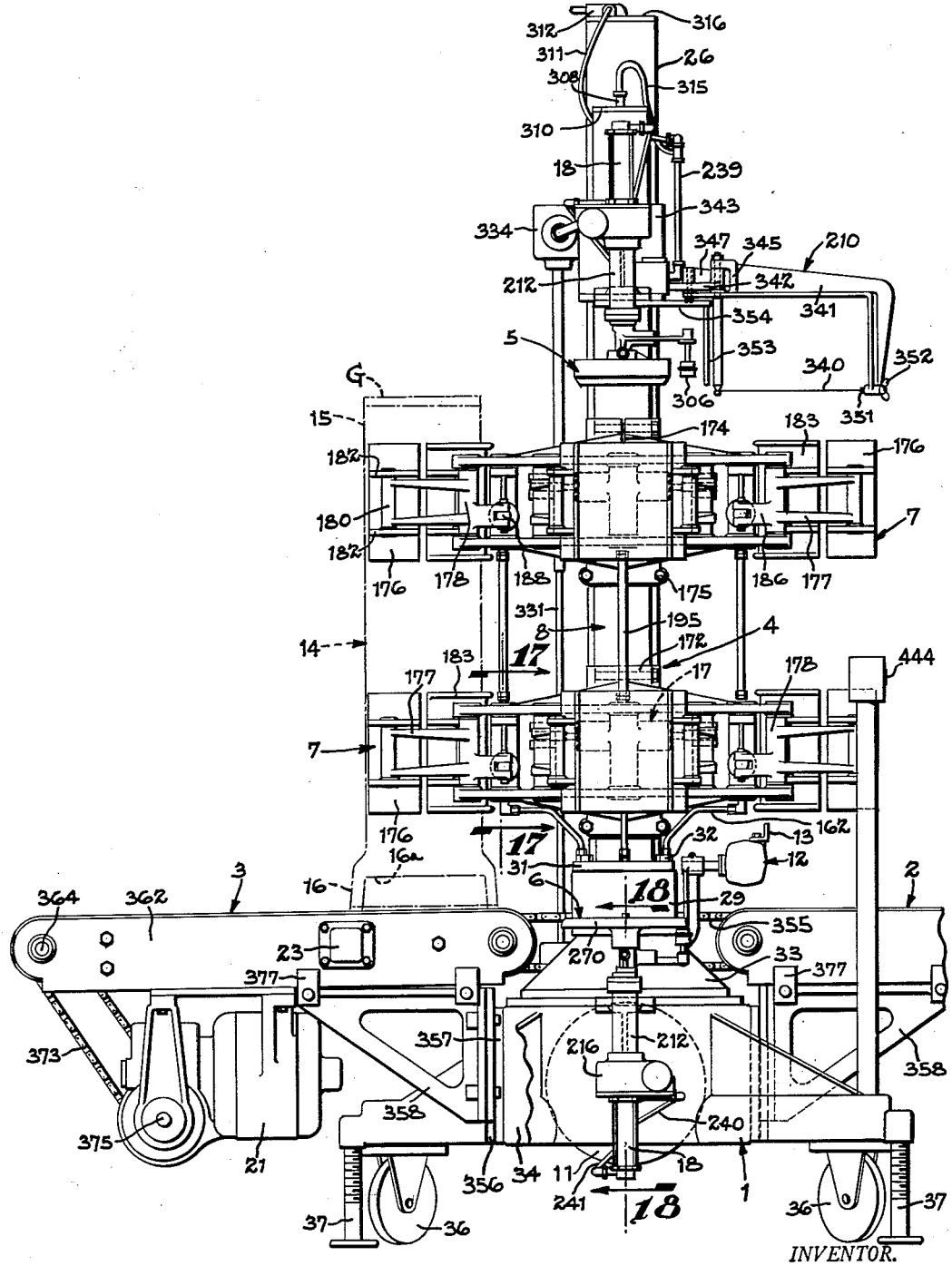
Figure 1 is a side elevation of the machine showing the general arrangement of the various operating parts. In this view a finished tile is shown in broken lines at the discharge station prior to release at the end of an operating cycle and the finishing heads are shown in retracted position which they assume temporarily while the turret indexes.

Described generally with reference to Figures 1 to 4, the tile finishing machine embodies a base 1 supporting the various components of the machine, including the tile feed conveyor 2, the discharge conveyor 3, the indexing turret 4, and the finishing heads 5 and 6. The indexing turret 4 carries four sets of radially extended jaws indicated generally at 7 which are indexed one-quarter of a turn upon each cycle of operation, the jaws being carried upon a vertical turret column 8 which is rotatably mounted upon the base 1. The stepwise indexing movements of the turret are produced by a Geneva mechanism indicated generally at 10 in Figures 5 and 6, which is driven by the main motor 11. This motor also powers the finishing heads. The cycles of operation are initiated by a starting switch 12 having an actuating arm 13 extending across the feed conveyor 2, and adapted to be tripped by the successive tiles as they are advanced to the turret.

Figure 2:
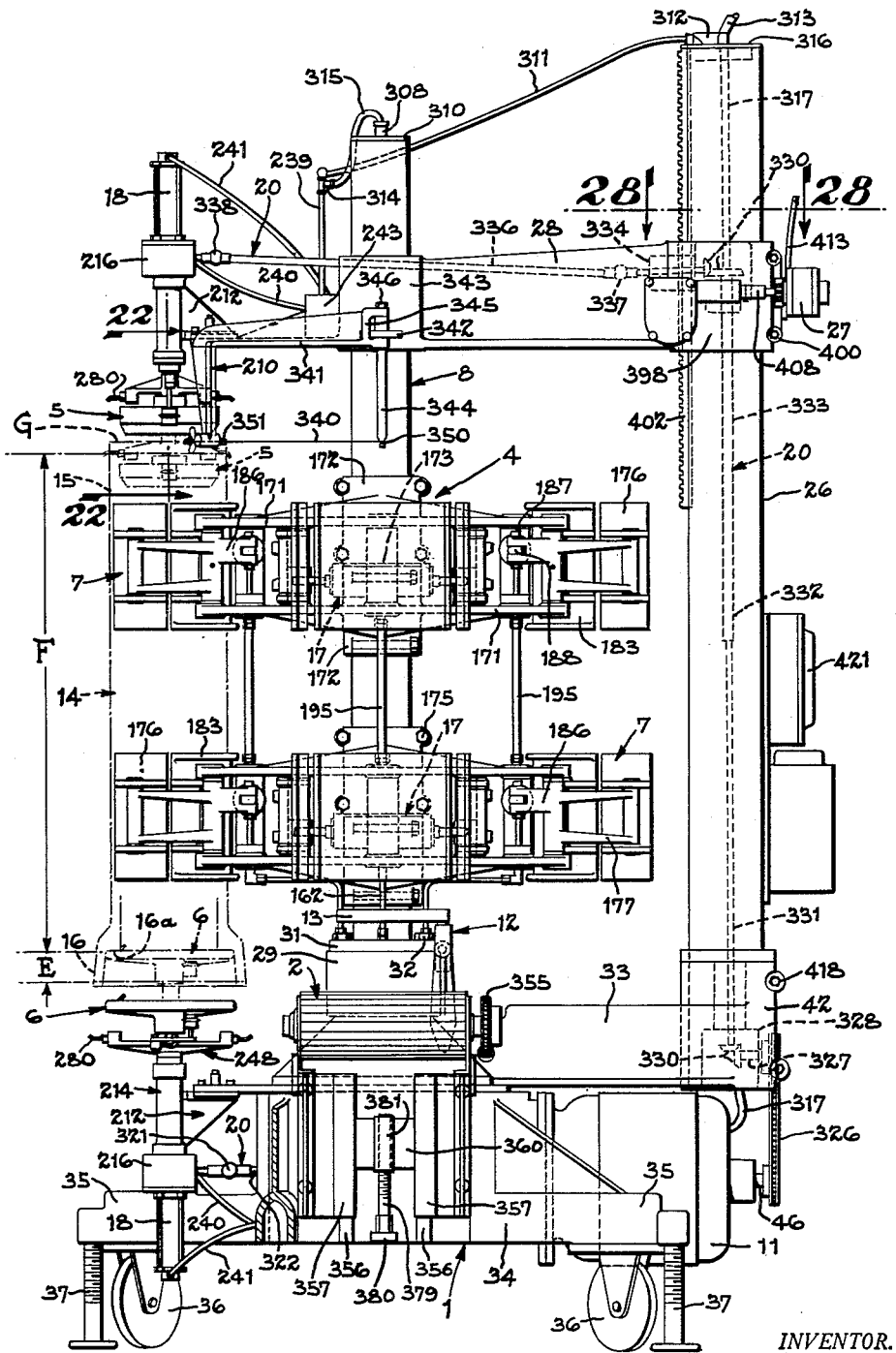
Figure 2 is a general view similar to Figure 1 looking toward the receiving side with a tile shown in broken lines at the finishing station. In this view the finishing heads are shown in retracted position in full lines and their normal extended position is indicated in broken lines.

A typical tile section, shown in broken lines and indicated at 14 in Figures 1 and 2, consists of the spigot or cylindrical portion 15 and the hub or coupling bell 16. The upper finishing head 5 is arranged to finish the spigot end of the tile and the lower finishing head 6 is arranged concurrently to finish the hub end of the tile as it is gripped by the clamping jaws.

Figure 4:
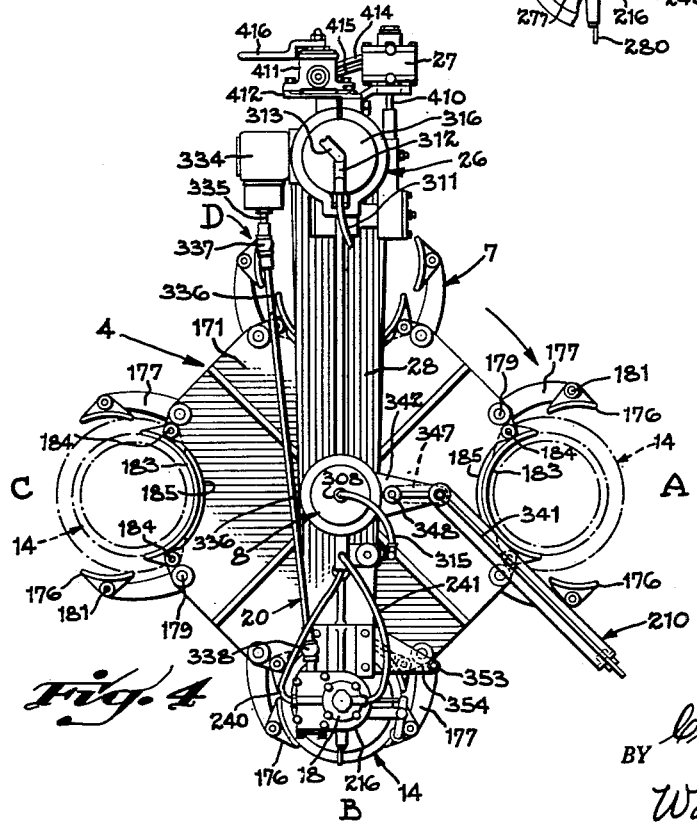
Figure 4 is a fragmentary top plan view generally similar to Figure 3 but showing the turret, cross arm and finishing head in position and with the base and conveyors removed to simplify the illustration.

As viewed in Figure 4, it will be observed that the clamping jaws are arranged radially at 90° apart so that upon one cycle of operation a given tile section will be advanced in stepwise fashion by the jaws from the feed conveyor 2, to a position in axial alignment with the finishing heads which are retracted at this time. At the same time, a previously finished tile will be advanced from the finishing heads to the discharge conveyor 3. When the unfinished tile is indexed to the finishing heads, the heads extend into it and perform the finishing operation, and at about the same time, the clamp jaws release the previously finished tile upon the discharge conveyor.

It is to be noted at this point that the jaws 7 are opened and closed at timed intervals by means of air cylinders 17, the operation of the air cylinders being governed by the electrically operated valves, forming a part of the cycle control apparatus, later to be described in detail. The upper and lower finishing heads 5 and 6 are advanced and withdrawn with respect to the opposite ends of the tile section by means of air cylinders 18—18, and the admission of air to these cylinders is also governed by electrically operated valves connected electrically to the control apparatus. The finishing heads are powered from the main motor 11 by means of a drive shaft system 20 extending to both heads and arranged to rotate them in unison and in opposite directions.

The conveyors 2 and 3 are driven by a motor 21 which is energized continuously while the machine is in operation. This motor is in constant driving connection with the discharge conveyor 3 in order to carry away the finished tiles as they are released by the clamping jaws on the discharge side at the end of each cycle. However, the feed conveyor run 2, also driven by this motor, is stopped as soon as an advancing tile trips the starting switch arm 13. This is necessary because the jaws will stop the tile section, and the hub end, which rests upon the conveyor, would be damaged if the conveyor were not stopped immediately.

For this purpose, a clutch 22 (Figure 3) is interposed in the drive to the feed conveyor; this clutch is disengaged by an air cylinder 23 (Figure 26) when the advancing tile contacts the arm of the starting switch. The cycles of operation are thus executed in response to the tiles advanced by the feed conveyor and this permits the tiles to be placed at random spacing on the conveyor for finishing.

The stepwise advancement of the turret, one indexing step for each cycle, is controlled by a single cycle clutch indicated generally at 24 (Figure 6) which is arranged to start a cycle of indexing movement when the starting switch is tripped by the advancing tile. The single cycle clutch mechanism is actuated by an air cylinder 25 (Figure 11), which is regulated by the control apparatus. The various electrical components, air cylinders, valves, and the electrical and air supply systems are best disclosed diagrammatically in Figure 32 and are described in detail later.

The machine is placed in operation by the manual starting switch mounted upon the main column 26 at one side of the machine. This switch energizes both the main motor 11 and the conveyor motor 21, both motors being driven continuously while the machine is in operation. The drive from the main motor to the Geneva mechanism is controlled by the single cycle clutch 24 and the feed conveyor drive is controlled by the conveyor clutch 22 as previously noted.

As best shown in Figure 4, the machine has four stations about which the turret indexes; these are designated repectively as the receiving station indicated at A, the finishing station B, the discharge station C and the idle station D. The turret indexes about these stations in the direction indicated by the arrow. When the motors are started, the turret remains stationary with the jaws on the receiving and discharge stations open. The jaws at the finishing station remain clamped upon the previously finished tile. The jaws at the idle station are also open since they were opened as they reached the discharge conveyor at the previous cycle of operation.

It is also to be noted that at the start of a cycle, the finishing heads are both extended into the previously finished tile and are withdrawn when the cycle starts to allow the turret to index. When a tile placed upon the feed conveyor advances toward the open jaws at the receiving station, the tile trips the starting switch arm 13 at the time it seats within the open jaws as shown in broken lines in Figure 4, the cycle of operation is initiated when the tile reaches this position.

As soon as the starting switch arm is tripped, the control system stops the feed conveyor by disengaging clutch 22, while the discharge conveyor continues to run. At the same time, the clamping jaws on the receiving side begin to close upon the tile which is now resting upon the stationary feed conveyor 2. As the clamping jaws at the receiving station are closed, the control system concurrently retracts the upper and lower finishing heads from the previously finished tile in order to allow the turret to index. The finishing heads are shown in Figure 2 in extended position in broken lines and in full lines in their retracted position. While the finishing heads are being retracted, the control system also applies air pressure to the cylinder 25, causing the single cycle clutch 25 to be tripped and the turret to index for one-quarter turn. The finishing heads are arranged to be fully retracted from the ends of the finished tile before the indexing movement of the turret begins.

When the cycle control mechanism is tripped, a driving connection is established from the main motor 11 by way of a worm and worm wheel drive to the crank arm of the Geneva mechanism as later described in detail. The cycle control mechanism allows the Geneva crank arm to execute one revolution, causing the Geneva wheel and turret to be rotated one-quarter turn. This carries the tile from the feed conveyor to a position in axial alignment with the finishing heads and the previously finished tile is now poised above the discharge conveyors for discharge at the end of the cycle.

After the turret indexes the tile, the control system admits air pressure to the cylinders 18—18, causing the rotating finishing heads, which were retracted at the start of the cycle, to move into opposite ends of the tile section and perform the finishing operations. Toward the end of the cycle, the feed conveyor clutch 22 is reengaged by the control system to advance the next tile to the set of jaws which are now in open position above the feed conveyor. The control system also exhausts the air pressure from the cylinder 24, thus setting up the single cycle clutch to be tripped for a single cycle when the next tile enters the jaws at the receiving side. Also, near the end of the cycle, the jaws at the discharge side are opened, causing the previously finished tile to be deposited upon the discharge conveyor.

As later described in detail, the turret indexing movement controls the cycle of operation of the various parts of the machine and the starting switch in turn governs the indexing of the turret. The cycle control mechanism is so arranged that only one indexing motion is executed when the single cycle clutch is tripped, even though its air cylinder remains in tripping position at completion of the indexing movement.

As described in detail in connection with the diagram of Figure 32, the single cycle clutch cylinder 24 receives its air supply from the same electrically operated valve which raises and lowers the lower finishing head, the system being so arranged that the cycle control mechanism is tripped only after the head is fully retracted from its finishing position. This interconnection provides an interlock which prevents the turret from being indexed until the heads are fully retracted. After the turret indexes, the finishing heads move into operating position and remain extended in this position until the next cycle.

*Tile size adjustment*

In the present disclosure both the spigot portion of the tile and the coupling hub are trimmed and grooved accurately to prescribed dimensions according to the setting of the machine. The length of the hub is determined from the internal shoulder 16a to the end of the hub as indicated at E in Figure 2 and the length of the spigot end is measured from the shoulder as indicated at F. To control the length of the hub, the conveyors 2 and 3 are adjustable vertically with respect to the lower finishing head 6, and to control the length of the spigot, the upper finishing head 5 is adjustable vertically with respect to the spigot end of the tile.

It will be observed that if the elevation of the feed conveyor 2 is changed with respect to the operating level of the lower finishing head 6, then the length E of the hub end will vary a like amount. In other words, the elevation of the feed conveyor determines the longitudinal position of the tile in the jaws at the receiving side of the machine and after the jaws clamp the tile, this position remains fixed as the tile is indexed from the conveyor to the finishing station. For example, if the feed conveyor is adjusted to trim a quarter inch from the hub end, the conveyor must be adjusted to an elevation to bring the lower end of the hub one-quarter inch below the cutting plane of the lower finishing head.

Bearing in mind that the clamping jaws index the tile in a horizontal plane, it will be apparent that the discharge conveyor should be disposed in a plane which is higher than the plane of the feed conveyor a distance approximately equal to the amount of material trimmed from the hub end. Thus, if the machine is set to remove one-quarter inch, then the discharge conveyor should be adjusted approximately one-quarter inch higher than the feed conveyor, plus an additional amount to allow clearance between the end of the hub and discharge conveyor when the finished tile is indexed to its final position above the discharge conveyor.

In order to control the length F of the spigot end of the tile, the upper finishing head 5 is adjusted vertically with respect to the column by the air motor 27 shown in Figures 2 and 28 as will be described in greater detail later. The upper finishing head 5 is mounted upon the outer end of cross arm 28, and this arm extends from the main column 26 to the turret column 8 and provides a rotatable connection with the turret column. The air motor is mounted on arm 28 and raises or lowers the arm and finishing head by a driving engagement with the main column. It will be apparent that by operation of the air motor, for adjustment of the upper finishing head, and by adjusting the elevation of the conveyors, the overall length of the tile, consisting of the dimensions E and F, can be regulated precisely and that the tiles produced will be uniform as to both dimensions.

The present automatic machine, as part of a production line, finishes tiles at a rapid rate. In the industry, it is the practice to manufacture the tiles of a given size in production runs, and the required quantity is often finished during the working day. If the next run is of the same diameter but of different length, the machine can be set up quickly for the new run by making one or both of the length adjustments outlined above without a great deal of delay.

On the other hand, the machine also is arranged to finish tiles of various diameters ranging, for example, from three to sixteen inches. For diameter changes, it is required that the clamping jaws and finishing heads be interchangeable to suit the required diameters. This change, as explained below, also can be made very quickly, so that runs of different diameters can be produced without undue loss of production time.

In the larger sizes which are transferred in socket boards, as disclosed in the copending invertor application, the finishing machine may be located in a position following the invertor so that the tiles are transferred with their hub ends up. In this case, finishing heads are transposed in position so that the hub or lower finishing head is mounted upon the cross arm in position to engage the hub. The operation of the machine in either case is identical.

Instead of replacing the jaws individually on the turret for diameter changes, it has been found most expedient to provide the machine with interchangeable turret assemblies complete with column, jaws of desired size, and other necessary operating components. Interchangeable sets of finishing heads, corresponding to the tile sizes of the turret assemblies are also furnished with the turret assemblies. The finishing heads constitute complete units and are easily replaced and the corresponding turret assembly also is easily replaced without disturbing the electrical system or air supply conduits and valves.

The turret assembly thus constitutes a self-contained unit ready for installation, having all necessary air and electrical connections. This structure is indicated diagrammatically in Figures 29 to 31. The base of the machine includes an indexing hub 29 arranged to interchangeably mount the column of the selective turret assemblies. The indexing hub includes the electrically operated air valves as indicated at 30 in Figure 32.

Each column constitutes an air pressure accumulator and the base of each column includes machined passageways which establish communication from the interior of the column to the air valves and from the air valves to the flange 31 of the column when the turret assembly is mounted upon the hub. As shown in Figures 1 and 2, the flange 31 of the turret assembly is secured to the hub by means of the nuts 32 threaded upon bolts fixed to the hub 29. The electrically operated valves, which control the supply and discharge of air for the jaw cylinders are mounted in the indexing hub 29 as later described in detail, so that interchanging the turret assembly does not disturb any of the operating parts of the machine.

*Single cycle clutch and turret drive*

As noted above, the base 1 supports the turret column 8 and the main column 26, the turret column being demountably secured upon the indexing hub 29. The base comprises an upper section 33 and a lower section 34. The lower section consists of a casting having radially extended legs 35 which are supported by casters 36. Upon being properly located, the machine is levelled in its permanent position by means of the jack screws 37 which are threaded in the ends of the legs 35.

The lower section 34 includes the main drive motor 11 and the gear train extending from the motor to the Geneva crank. This portion of the base, as best disclosed in Figures 5, 6, and 7, includes a cylindrical housing 38, forming the central portion of the base and enclosing the Geneva wheel 39.

Figure 3:
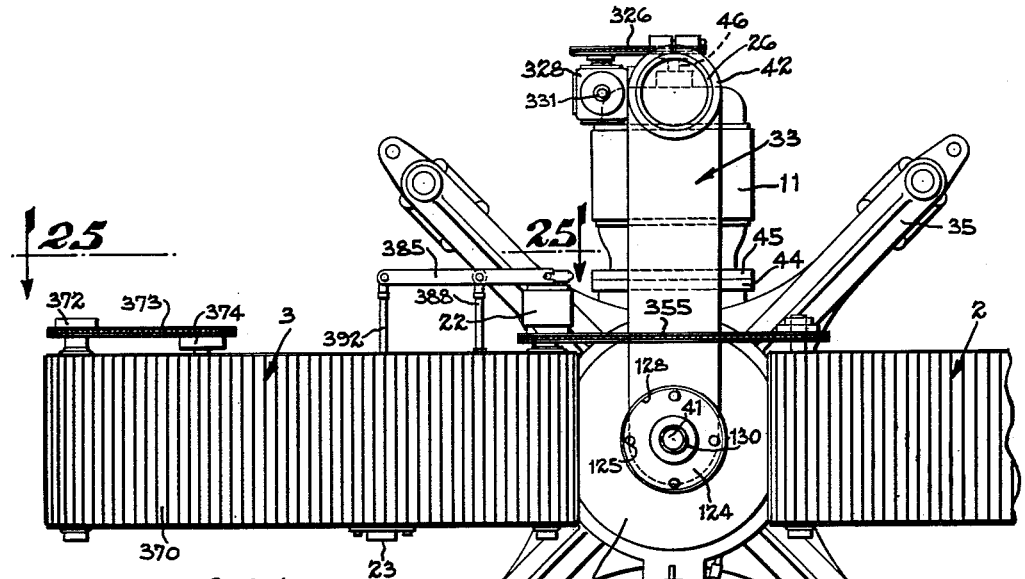
Figure 3 is a fragmentary top plan view of the machine as projected from Figure 1, the turret, cross arm and upper finishing head being removed from the indexing hub in order to illustrate more clearly the conveyors and base structure.

The upper section 33 consists of a box-like casting (Figures 3 and 6), which provides a bearing sleeve 40 for the Geneva wheel and indexing hub 29. The Geneva wheel includes a shaft 41 which extends upwardly into driving connection with the indexing hub (Figure 12). The opposite end of the upper base section includes a clamp sleeve 42 for mounting the lower end of the stabilizing column 26 (Figure 3). The structural details of the turret column structure and mounting will be described later.

Referring to Figures 6 and 7, the main motor 11 is mounted directly upon the lower base section, the section having a gear box 43 which includes a flange 44 for mounting the flange 45 of the motor. The motor shaft 46 includes a gear 47 within gear box 43, meshing with a gear 48 keyed to a worm shaft 50. Shaft 50 is journalled in ball bearings 51—51 which are mounted in a sleeve 52 formed within the base section, the sleeve including a cylindrical housing 53 for the worm wheel 54 which is arranged to drive the crank arm 55 of the Geneva mechanism. Worm wheel 54 is loosely journalled upon its shaft 56 and is arranged to drive the shaft by way of the single cycle clutch indicated generally at 24 in Figures 6 and 10.

Clutch 24 is a commercial structure and includes an eccentric clutch ring 57, shown in broken lines in Figure 10, adapted when released to provide a driving connection from the hub 58 of the worm wheel to shaft 56. The clutch ring 57 is normally held in arrested position by means of the finger 60 which engages the offset 61 of the clutch ring, the worm wheel being driven in the direction indicated by the arrow. When finger 60 is tripped from the position shown, the ring will transmit the torque from the hub 58 by means of the clutch rollers 62 (Figure 6) to the worm wheel shaft 56, thereby causing rotation of the crank arm 55 of the Geneva mechanism.

In the present disclosure, the release finger 60 is retracted momentarily to allow the clutch ring 57 to begin its rotary movement and is then brought back into bearing engagement upon the periphery of the ring so as to engage the offset 61 after one rotation. This rotates the crank arm one full turn and brings it to a stop after each cycle of operation and thereby produces one-quarter revolution of the Geneva wheel 39. As described later in detail, the release finger 60 is tripped by means of the air cylinder 25 which operates the tripping mechanism indicated generally at 63 in Figure 11. The air cylinder 25 is supplied with compressed air and exhausted at timed intervals by the control system as described at a later point.

As shown in Figure 6, worm wheel shaft 56 is loosely journalled in housing 53 by the ball bearing 64, having its outer race fitted in a bore formed in the housing and having its inner race engaged between the hubs of the crank arm and worm wheel. The lower end of shaft 56 extends downwardly and is journalled by a ball bearing 65 mounted in a housing 66 (Figure 9) which encloses the tripping mechanism 63. The crank arm is keyed as at 67 to shaft 56 and is held against endwise displacement by the washer 68 and screw 69. A roller 70 is rotatably mounted upon the swinging end of the crank arm and is arranged to engage the cross slots 71 of the Geneva wheel as shown in Figure 8. In the position shown in broken lines in this view, the roller is in its inactive position in the central recess 72 of the Geneva wheel, with the wheel and turret locked in indexed position.

The wheel is locked against rotation by means of the arcuate rim 73 of the crank arm which is concentrical with the axis of shaft 56, the rim being engaged in one of the four arcuate recesses 74 extending downwardly from the periphery of the Geneva wheel. The recesses 74 are of the same radius as the rim 73 and the rim is free to rotate to a disengaged position as the crank is rotated during its cycle and is completely disengaged from the recess 74 when the roller 70 begins to engage one of the cross slots of the Geneva wheel. As the crank roller moves through its orbit of rotation, it will advance the Geneva wheel one-quarter turn and as the roller begins to move out of engagement with the cross slot near the end of the cycle, the arcuate rim will again engage the locking recess.

As above noted, in connection with Figure 9, the shaft 56 of the worm wheel extends downwardly into the housing 66, the cycle control finger 60 being located in the upper portion of the housing, being pinned to a rock shaft 75 which extends downwardly into the housing. The cycle control tripping mechanism previously indicated at 63, is mounted within the lower portion of housing 66. The housing includes a top wall 76, a boss 77 for the ball bearing 65, and a boss 78 for journalling the rock shaft 75. The housing assembly is secured to the lower base section 34 by means of screws 80 (Figure 6) passing through the flanges 81 and also includes a bottom closure plate 82 secured by screws 83. The lower portion of the worm wheel shaft 56, journalled in the ball bearing 65, includes a timing disk 84, keyed to the shaft as at 85 and forming a part of the electrical control circuit described later with reference to the diagram shown in Figure 32.

Described in detail with reference to Figures 9 and 11, the cycle control tripping mechanism 63 consists of a trip lever 86 which is actuated by the air cylinder 25 and arranged to actuate a rocker arm 87 which is keyed to the rock shaft 75 of clutch finger 60. Since it is desired to trip the clutch finger 60 momentarily and to allow it to snap back immediately into engagement with the clutch ring 57, the trip lever 86 is arranged to swing the rocker arm 87 in tripping direction only once upon the forward and return stroke of the piston rod 88 which actuates trip lever. For this purpose, the swinging end of trip lever 86 is provided with a cam 90 pivotally mounted upon a pin 91 passing through the lever. Cam 90 includes a spur 92 which engages the roller 93 rotatably mounted as at 94 upon the swinging end of rocker arm 87. Arm 87 is normally held in the clutch engaging position shown, by means of the tension spring 95, anchored as at 96 to the rocker arm and having its opposite end anchored as at 97 upon the axis of the pin 98 which pivotally mounts the trip lever.

Cam 90 further includes a lug 100 engaged by a second tension spring 101 which is anchored as at 102 upon the trip lever. The swinging end of the rock shaft is bifurcated to receive the cam and the cam normally is pivoted rearwardly into engagement against the back wall of the bifurcation under the tension of spring 95. Upon downward movement of trip lever 86 toward roller 93, the wall 103 maintains the cam 90 in operating position, causing spur 92 to cam the roller 93 and rocker arm 87 to the left as viewed in Figure 11. This swings the clutch finger 60 out of engagement with the offset 61 formed in the clutch ring 57, as viewed in Figure 10. After the point of the spur trips the rocker arm and clutch finger, spring 95 will immediately snap the rocker arm back to the right, causing the clutch finger to snap back into engagement against the clutch ring. Since the clutch ring has now begun its cycle of rotation, it will continue to rotate until the offset 61 again rotates into abutment with the finger at the end of the cycle, thus driving the Geneva crank arm 55 through one cycle of rotation.

When the trip lever 86 is returned back to tripping position, the clutch finger 60 remains engaged against the periphery of the clutch ring by operation of the cam 90. In other words, as the trip lever swings upwardly, the opposite side of spur 92 will engage roller 93 and will tend to swing the rocker arm 87 in tripping direction. However, since the cam is pivotally mounted, it will pivot upon its pin 91 and pass the roller without moving the rocker arm. The mechanism is arranged to operate in this manner because the control system applies air pressure to cylinder 25 to start the indexing movement, and relieve the pressure after a time delay. The reasons for the time delay are explained in the detailed description of operation with reference to Figure 32; however, it will be apparent at this point that admission of air to cylinder 25 will trip the clutch for an indexing cycle and that release of the air will reset the tripping mechanism without tripping the clutch for a second indexing cycle.

The admission of air to cylinder 25 is by way of the conduit 105, air pressure being supplied and exhausted in time with the indexing cycle as later described. The cylinder includes a head 106 secured by screws 107 to the housing 66, and the piston rod 88 extends from the opposite end of the cylinder. The cylinder includes a piston 108 connected to the piston rod 88 and a spring 110 normally urges the piston and rod to the reset position shown. The outer end of the piston rod is pivotally connected as at 111 to the lever 86. The arrangement is such that admission of air to the cylinder moves the piston and trip lever 86 in tripping direction while release of the air pressure allows the piston and trip lever to be retracted by the compression spring 110 to the reset position.

As noted above, the worm wheel shaft 56, which drives the crank arm 55, also carries the timing disk 84. This disk forms a part of the control system and produces an electrical impulse in time with each indexing movement of the turret as later explained. It should be understood at this point however, that the disk rotates in unison with the Geneva crank and completes momentarily an electrical circuit toward the end of each rotation.

For this purpose, the disk is formed of dielectric material and includes an arcuate metal contactor 112 which completes an electrical circuit between two stationary metal brushes 113 and 114 which are mounted in a block 115 (Figures 9 and 11). Block 115 is formed of dielectric material and is secured to the underside of housing 66 by the screws 116. The timing disk rotates in the direction indicated by the arrow in Figure 11 such that it closes the circuit across the brushes toward the end of the cycle and stops out of contact with brush 113 leaving the circuit open.

Each brush is mounted in a metal thimble 117 pressed in the block 115. A compression spring 118 within the thimble forces the brush into engagement with the timing disk and a screw 120 threaded into the thimble provides a terminal for the electrical lead. The surface of the contactor 112 is flush with the surface of the timing disk to prevent interference with the brushes during rotation of the disk.

*Turret column and valve arrangement*

As above noted, the turret column 8 is mounted upon its indexing hub 29 by the bolts and is demountable as a unit in order to change the machine from one tile diameter to another. As best disclosed in Figures 12 to 14, the hub consists of a cylindrical housing 121 having an internal sleeve 122 slidably keyed to the splined portion 123 of the Geneva wheel shaft 41. Sleeve 122 includes a top plate 124 to receive the base flange 31 of the column, and the bolts 125 are secured in this plate by pins 126, such that the bolts remain in position when the nuts 32 are removed. A gasket 127 is interposed between the base flange 31 of the column and the top plate 124 to provide an air pressure seal. The cylindrical housing is attached to the top plate by the internal lip 128 which seats within a recess formed around the upper edge of the top plate. The housing may be removed for inspecting the parts within the indexing hub when the column is demounted.

Shaft 41 is journalled upon spaced roller bearings 129—129 confined in the bearing hub 40 formed in the upper section 33 of the base. The sleeve 122 is locked against axial displacement upon shaft 41 by means of the lock nut 130 which is threaded upon the upper end of the stub shaft. The intermittent advancements of the Geneva wheel are therefore transmitted by way of shaft 41 to the hub 29 and from the hub to the turret assembly.

The cylindrical housing 121 encloses the electrically operated valves indicated at 30, and the brush holder assembly 131. The valves are indexed with the turret to control the admission of air to the clamp jaw cylinders of the turret and the brush holder is mounted in stationary position upon the base section 33. As noted previously, the column is used as an accumulator or air reservoir and the air passageways are formed in the top plate 124 and lead directly from the interior of the column, through the valves to the air lines of the clamp jaw cylinders, as indicated diagrammatically in Figure 31. There is provided one valve respectively for each set of clamp jaws and as the valves and their associated clamp jaws are indexed from station to station, the brush assembly energizes the valves at the receiving station to close the jaws, and at the discharge station to open the jaws.

As shown in Figures 12 and 14, the brush holder assembly consists of a ring sector 132, formed of insulating material and seated in a plate 133 which is recessed to receive the sector. The plate 133 is secured to the top of the base section and the plate and sector are enclosed by the cylindrical housing 121. The sector is provided with a pair of spring loaded contactor brushes indicated generally at 134 and 135, similar to the timing disk brushes 113—114 previously described. Electrical contact is established through the brushes by the respective contacts 136 and 137, each of which is mounted in an insulating button 138 (Figure 12) seated in a counterbored hole 140 formed in the top surface of the upper base section 33. This arrangement allows the sector to be replaced, in case its brushes become worn without disturbing the electrical wiring or dismantling the indexing hub. Electrical contact is established from the electrical wires 141 and 142 (Figure 14) to the brushes, and from the brushes to the opposite terminals 143 and 144 of the electrically operated valves 30. Brush 135 closes the clamp jaws at the receiving station and brush 134 opens them at the discharge station as explained later. It will be noted that the insulating sector and its brushes are stationary with respect to the valve terminals such that the valves at diagonally opposite sides of the hub will be energized in response to rotation of the indexing hub.

Each valve includes a double solenoid winding and a movable slide 145 cooperating with ports, as later described, to open and close the clamping jaws as determined by the position of the valve slide. The slide is shifted to either of its two positions upon energizing the respective terminals 143 and 144, these being arranged to contact the radially offset brushes 134 and 135 respectively.

The valve operating contacts 136 and 137 are mounted upon a disk 146 formed of insulating material and nonrotatably secured to the flange 147 of sleeve 122 by a pin 148 and screws 149. The contacts 136 and 137, one pair for each valve, are riveted in the disk 146 and are in electrical connection with the respective terminals 143 and 144, which lead to the opposite ends of the solenoid windings of the respective valves as shown in Figure 32. The valves in turn are secured to the top plate 124 by screws 150.

It is to be noted in Figures 14 and 32 that the contacts 136 and 137 are located at 90° apart, the contact 136 of one valve being radially in line with the contact 137 of an adjacent valve. All four contacts 136 are on the same radius as the brush 134 and all four contacts 137 are on the same radius as the brush 135. The arrangement is such that the contact 136 at the discharge station will contact the brush 134 and at the same time, the contact 137 of the valve at the receiving station will contact the brush 135. This conditions the apparatus to energize and shift the valve at the discharge station to clamp opening position and the valve at the receiving station to clamp closing position. The respective moving valve contacts 136 thus constitute clamp opening contacts and the contacts 137 constitute clamp closing contacts. The circuit and operation will be described later in detail with reference to Figure 32.

The construction of the valve, the valve slide and cooperating passageways, is detailed in Figures 12, 15 and 16, the arrangement shown being duplicated in each of the four valves. The valves which regulate the conveyor clutch cylinder and the cylinders of the finishing heads are also of this construction but their parts are slightly different as disclosed in connection with Figure 32. As shown, air supply passageways 151, one for each valve, are milled in the top plate 124, and each passageway extends from the interior of the column to the undersurface of the top plate. A screen 152 (Figure 13), is installed in each passageway to prevent dirt from reaching the valve slide. A valve slide plate 153 is interposed between the body of the valve and the surface of the top plate 124, and includes a gasket 154 to prevent the escape of air. Each valve slide plate 153 is ground to provide a sliding surface for the valve slide 145 and the plate 153 includes a passageway 155 (Figures 12 and 13) communicating with the supply passageway 151 and leading into the bore 156 of the valve. Air pressure thus is introduced to the exterior of the valve slide, the body 157 of the valve being air tight.

The slide plate 153 includes a supply port 158 which communicates with the passageway 160 formed in the top plate 124 (Figures 15 and 16). Passageway 160 leads to a second passageway 161 formed in the column base flange 31 and leading to the conduit 162 which extends to the clamping jaws. Air pressure from passageway 160 is transmitted to passageway 161 by way of a lateral passageway 163 formed in the gasket 127 interposed between the two flanges.

The slide plate also includes an exhaust port 164 communicating with the atmosphere by way of the lateral exhaust passage 165 (Figure 12). In the position shown in Figure 15, which corresponds to the discharge station, the recess 166 of the valve slide connects the exhaust port 164 with the supply port 158 leading by way of passageways 160 and 161, to the clamp jaws. This allows the air to be exhausted by way of conduit 162, passageways 161 and 160, port 164. From port 164 the air is exhausted from the clamp cylinders by way of the lateral exhaust passageway 165.

At the receiving station, the valve slide 145 will be shifted to the right as indicated in Figure 16. It will be observed in this position that the valve slide uncovers supply port 158 and allows air pressure to pass from the column by way of passageways 151 and 155 into the valve body, and from the valve body directly through port 158, passageways 160 and 161 to the conduit 162. The valve assumes this position when its contact 137 is in contact with the brush 135 as shown in Figure 14, when the advancing tile trips the starting switch at the beginning of a cycle.

As above noted, the control valves are of commercial design and have not been disclosed in complete detail. In general each valve includes a cylindrical plunger 167 having a groove 168 engaging a lug 170 extending downwardly from the slide. The plunger is shorter than the valve body to permit it to be shifted to the two positions shown, when the respective terminals are energized. The valve includes two windings indicated diagrammatically in Figure 32, these windings being located inside the plunger and adapted to shift the plunger and slide to the indicated positions upon being energized. The intermediate ends of the windings are grounded in common as indicated in the diagram so as to complete the circuit from the respective terminals through the winding to the body of the valve which is grounded to the machine and which forms the other side of the control circuit.

When the valve is shifted to the jaw closing position shown in Figure 16, the air pressure forces the pistons apart, as later described, thereby closing the jaws upon the clay tile under predetermined pressure. After the jaws are indexed from the receiving station to the finishing station, the valve will be deenergized, but by its construction it will remain in the position shown, thereby maintaining air pressure on the clamping cylinder constantly until the jaws are indexed to the discharge station. In this manner a positive engagement is maintained upon the tile section while it is being indexed to and from the finishing station and during the finishing operation. Upon reaching the discharge conveyor, the valve contact 136 establishes contact with the brush 134, causing the valve to be shifted to jaw opening position when the timing disk closes its contacts near the end of the cycle.

From the foregoing, it will be observed that the column 8 provides a reservoir of air under pressure to operate the clamping jaws quickly and without any appreciable drop in line pressure. Utilizing the column as a reservoir in cooperation with the passageways and component air valves produces an exceedingly simple arrangement. The arrangement of the electrically operated valves and brush assembly simplifies the electrical system, provides more efficient and reliable operation by the elimination of wiring and other components. The air supply and electrical system are thus self-contained and permit the convenient interchange of turret assemblies without disturbing any part of either system.

Clamp jaw structure

Clamping jaws similar to those used in the present machine are disclosed in the copending application on the invertor, noted previously. Described with reference to Figures 1, 2 and 4, the clamping jaws are mounted upon column 8 between spaced pairs of bracket plates indicated at 171. The mounting structure for the upper and lower jaws is identical and the following detailed description applies to either assembly. The jaws and their operating cylinders are confined between the spaced bracket plates 171—171, the respective plates being separable with respect to one another for assembly of the jaws and other parts.

It will be noted in Figure 2 that each plate 171 includes a sleeve 172—172 frictionally embracing the column. These sleeves are separated from one another as indicated in broken lines at 173 and each sleeve is split longitudinally as at 174 in Figure 1. Clamping screws 175 extend through the split portions of the sleeves to draw them firmly into clamping engagement with respect to the column. It will be noted that the split portions 174 for the upper and lower sleeves are related at right angles with respect to one another in order to distribute the clamping pressure.

Each clamp jaw assembly 7 consists of a pair of jaws 176—176 of arcuate shape (Figure 4), mounted on levers 177, each lever having an elongated hub 178 (Figure 1), which is fitted between the spaced bracket plates and pivotally mounted by a pin 179 passing through the plates and hub. The levers 177 are disposed in pairs one above the other and include a second or swinging hub 180 forming an integral part of the levers. The swinging hubs 180 carry the arcuate clamping jaws by means of a pivot pin 181 passing through the spaced lugs 182—182 of the jaws and through the hub 180.

In addition to the jaws 176—176, each clamp assembly is provided with a stationary arcuate pad 183 which cooperates with the movable jaws to embrace the tile in the manner shown in Figure 4. The stationary pads are mounted as at 184—184 at a point adjacent the pivot points 179. The bracket plates 171 are provided with arcuate recesses 185 for receiving the stationary pads. The clamping jaws and cooperating pad cooperate with one another to embrace the plastic tile firmly but without deforming it and the upper and lower jaw assemblies are accurately aligned with one another to maintain the tile in straight condition.

Referring to Figure 17, the movable clamping jaws 176 are actuated by the clamp cylinders previously noted, each lever 177 being provided with an actuating lever extension 186 pivotally connected as at 187 to the piston rod 188 of the clamp cylinder assembly. As shown, the lever extension is bifurcated as at 189 to receive the actuating end of the piston rod. Outward movement of the piston rod swings the levers and clamping jaws inwardly toward one another to provide a clamping engagement with the tile when air pressure is admitted to the cylinder. The aligned upper and lower body assemblies are actuated by respective cylinder assemblies 17 connected in common to the air pressure system as described later so that both clamping assemblies operate in unison and at equalized clamping pressure.

Each clamping cylinder includes a vertical spacer 190 secured by screws 191 passing through the bracket plates into the opposite ends. A gasket 192 is placed between the adjoining faces of the bracket and collar to provide a seal. The spacer includes a longitudinal air passageway 193 in endwise registry with passageways 194 formed in the bracket plate for supplying air.

As shown in Figures 1 and 2, an air conduit 195 extends between each upper and lower assembly and the air supply is taken from the base of the column by way of the conduit 162 which extends from the base flange 31 of the column to the lower cylinder assembly. Air pressure thus passes from the base of the column by way of conduit 162 to the lower clamp jaw cylinder and from the lower cylinder to the upper by way of the conduit 195. This arrangement is the same for each set of upper and lower clamp jaws.

As detailed in Figure 17, each cylinder assembly 17 includes a pair of opposed pistons 197—197 facing one another and slidably confined in the cylinders 198—198 extending laterally from the opposite sides of the spacer column 190. A piston cup 200, formed of leather or equivalent material, is clamped against the piston by means of a plate 201. The piston rod 188 includes a shoulder 202 engaging the piston and the clamping plate is engaged by a nut 203 threaded upon the end of the piston rod.

The opposite end of the piston rod passes through a piston head 204 secured by screws 205 to the cylinder. The extended outer end of the piston rod is provided with an eye 206 which is screwed upon the piston rod as at 207 and connected to the bifurcation 189 of the actuating lever extension by the pivot screw 187 previously noted. The eye permits longitudinal adjustment of the piston rod and is locked in adjusted position by a nut 208 screw threaded on the piston rod and engaged against the shank of the eye.

Each piston is maintained normally in its inward limit of travel by a compression spring 209, having one end seated against the piston and its opposite end seated against the closure plate 204. By virtue of the construction, air pressure admitted into the cylinder by way of passageway 193 acts simultaneously upon both pistons to force the cooperating clamping jaws into clamping engagement with the tile. Upon release of the air pressure, the springs return the jaws to their open position and the air trapped between the pistons is exhausted back through passageway 193 by way of the electrically operated valves in the driving hub as previously explained.

Finishing heads

As disclosed in Figure 2, the upper and lower finishing heads reside in extended position, as shown in broken lines at all times except while the turret is indexing. As the unfinished tile is indexed from the feed conveyor during the cycle, both finishing heads are retracted from the ends of the tile to the position shown in full lines, the turret is then indexed, and immediately after indexing, the constantly rotating heads move back into extended position and finish the ends of the tile. At the end of the cycle they remain rotating in this position until the beginning of the next cycle when they are again temporarily retracted. The lower finishing head assembly is also shown in detail in Figure 18 in retracted position and its extended position is indicated in broken lines.

It is to be noted at this point that if the spigot end of the tile is too long to pass under the upper finishing head, it is given a preliminary trimming operation as it is indexed from the feed conveyor to the finishing station. This operation is performed by a trimmer, indicated generally at 210 (Figures 1 and 2), stationed in the indexing path of the tile slightly below the plane of the finishing head mandrel. The trimmer includes a thin taut wire suitable to pass through the plastic tile and those tiles which extend above plane of the wire are trimmed to a uniform length indicated by the line G in Figure 2 as they pass through the wire. The radial position of the trimmer is shown in Figure 4.

The finishing heads trim the end of hub 16 and spigot end 15 of the tile to predetermined length and also perform a grooving or scoring operation upon the outside diameter of the spigot end and a similar grooving operation upon the inside diameter of the hub end. The shoulder 16a at the hub also receives a chamfer along with the trimming and grooving operation to remove any flashing which may be present.

As noted above, the finishing heads may be arranged to finish the tiles in inverted position, that is, with the tiles resting upon their spigots as they are advanced to the turret. This is necessary in finishing the large diameter tiles. In the following disclosure, the hub finishing head is located at the bottom in order to finish tiles advancing in the position they assume as they leave the forming machine. It will be understood the mounting apparatus is in duplicate for both heads so that they may be interchanged conveniently. When operating on the large tiles, the invertor may be arranged to deliver the tiles in inverted position directly upon the feed conveyor.

The finishing heads each include a mandrel which enters respectively the hub and spigot ends of the tile, the respective mandrels being approximately of the same diameter as the inside diameters of the hub and spigot. The turret in its indexed position is fixed and the mandrels are accurately aligned with the axis of the indexed tile. The arrangement is such that the mandrels, upon being extended into the plastic tile, will bring the tile into axial alignment even though it may have been bent slightly in handling.

The finishing heads are shifted axially into and out of working engagement with respect to the tile by the air cylinders 18—18, air being valved to the respective cylinders from the air pressure supply system by the electrically operated valves and control system briefly described above. In the present machine, the air cylinder assembly is identical for the upper and lower finishing heads; therefore, the following description of the lower finishing head assembly applies to both.

The inside and outside grooving operations are executed by grooving rollers which are rotatably mounted upon the finishing heads. These rollers each include a flat tracking surface adapted to contact the surface of the tile on the inside and outside to control the groove depth, the tracking surface having a circumferential bead or ring which is shaped in cross section to the configuration of the groove. The flat tracking surfaces control the depth of the groove while the bead penetrates the plastic material as the roller is rotated in tracking engagement upon it.

Since the grooving rollers must move into facial engagement against the respective surfaces of the tile, they normally assume a retracted position out of contact with the surface of the tile and are extended gradually during rotation of the finishing heads so as to progressively deepen the groove as the roller is rotated around the tile. This mode of operation prevents marring of the tile surface as the rollers are brought into operating position; in addition, it has been found in practice that the progressive formation of the groove produces a cleaner and more accurate groove contour.

A simplified arrangement has been developed for causing the upper and lower grooving or scoring rollers to move progressively into the tile surface after the cutting heads assume their final operating position. This arrangement in both instances consists of a piston and cylinder assembly connected by suitable linkage to the grooving roller and supplied with air pressure which is metered from the main operating cylinder 18 of each finishing head. The arrangement is such that when air pressure is valved into the main actuating cylinders, the finishing heads are moved concurrently into the opposite ends of the tile. A metering aperture, communicating with the interior of the main actuating cylinder, allows a controlled quantity of air pressure to pass from the main cylinder 18 to the roller actuating cylinder and piston assembly.

The grooving roller piston of each finishing head is spring loaded in its retracting direction so that the metered air is insufficient to move the roller into operating position while the cutting head assembly is being moved toward operating position. However, when the finishing head reaches final position, with its piston engaged against the end of the cylinder, a sufficient back pressure is developed in the main actuating cylinder 18 to overcome the bias effect of the spring, thereby causing the roller piston to move the roller progressively into tracking engagement against the tile surface. The metering aperture restricts the flow of air to such an extent that the grooving roller penetrates gradually into the surface of the plastic tile during several revolutions to produce a smooth, uninterrupted groove during the several passes of the grooving roller around the circumference of the tile.

As above noted, the operating cylinder assemblies for both finishing heads are duplicated and the following detailed description in conjunction with Figures 18 to 21 will apply to both assemblies. As shown in Figures 1, 2 and 3, the cylinder assembly for the lower finishing head, is secured by means of a bracket 212 to the base section 34 of the machine. The upper finishing head assembly is secured by an identical bracket 212 to the cross arm 28 in a similar manner. As shown in Figure 18 the lower finishing head assembly constitutes two sections, the lower section 213 including the air cylinder 18 and an upper section 214 including a bearing bracket for a combined drive shaft and piston rod 215 upon which is mounted the finishing head.

At the juncture between the cylinder and bearing bracket there is provided a gear box 216, see also Figure 19, which encloses a worm wheel 217 in mesh with a worm 218 for rotating the combined piston rod and drive shaft 215. The worm is journalled in bearings 220—220 fitted in a sleeve 221 forming a part of the gear box and is driven by the drive shaft system 20 which extends from the finishing head to the drive motor 11, as described in greater detail later. At this point it is to be noted that the motor 11 is driven continuously during operation of the machine and that it is connected by way of the drive shaft system 20 both to the upper and lower finishing heads so that both rotate continuously, but in opposite directions.

Again referring to Figure 18, it will be observed that the combined piston rod and drive shaft 215 is rotatably mounted in the bearing bracket 214 by the upper and lower ball bearings 222—222, the shaft being slidably confined in a driving sleeve 223 which is rotatably supported by the bearings 222. The lower end of the driving sleeve 223 is keyed as at 224 to the worm wheel 217 and the worm wheel is locked against axial movement by means of the nut 225. The drive shaft and piston rod 215 is splined as at 226 to the lower portion 227 of the sleeve, being splined to provide the driving connection (Figure 19).

The splined connection so provided, transmits the drive from the worm wheel 217 to the shaft 215 and also provides a slidable connection so that the rotating shaft can be shifted axially by operation of the actuating cylinder 18. The piston rod section 228 extends through a packing gland 230 formed in the gear box to prevent escape of air from the cylinder and the end portion of the piston rod is connected to the piston 231.

The connection between the piston and the combined piston rod and drive shaft allows rotation of the piston rod with respect to the piston, the rotatable connection being provided by the ball bearings 232. These ball bearings are confined in a complementary race formed in the piston and in the piston rod.

For this purpose, the piston rod includes a semi-circular groove and the piston includes a corresponding semi-circular groove formed in two half sections to permit insertion of the balls. The piston includes an end plate 233 secured by screws 234, the raceway being formed between these two parts. The end plate is of course removed to permit insertion of the balls and is then fastened in position by the screws to provide a rotatable connection with the rod. The skirt 235 of the piston is grooved and flexible sealing rings 236 are installed in these grooves in the customary fashion.

The piston includes ports 237 and 238 at opposite ends in communication with the flexible air conduits 240 and 241 to cause piston reciprocation by air pressure in either direction. Air is supplied to the respective conduits by electrically operated reversing valves. The valve for the lower head is mounted in the base 1 and is indicated at 242 in Figure 5. The upper valve is mounted on the outer end of arm 28 and is indicated at 243 in Figure 2. Air pressure is supplied to these valves from the column air reservoir by way of the conduits 239, which branch from the upper end of the reservoir.

In order to supply air pressure to the scoring roll cylinder, a bore 244 is formed through the piston rod 228 and drive shaft section 215 leading to a lateral port 245 formed at the upper end of the shaft section. The upper end of the shaft section is screw threaded as at 246 to provide a detachable connection for the hub 247 of casting 248 in which is formed the scoring roll cylinder 250. A groove 251 is machined in the shaft to provide communication from the port 245 to a passageway 252 leading to the scoring roll cylinder. A second groove is also machined in the shaft to provide a seat for a sealing ring 253 which prevents air leakage from the hub.

Air is admitted to bore 244 by way of the metering orifice 254 drilled through the lower end of the piston rod. The lower end of the bore 244 is closed off by a ball check valve 255 held in closed position by a compression spring 256 seated within a thimble 257. It will be apparent, that air under pressure beneath the piston is in communication with the scoring roll cylinder by way of the metering orifice 254, bore 244, lateral port 245, and from port 245 by way of passageway 252 to the cylinder.

It is also to be noted that the piston 258 of the scoring roll cylinder is biased by the compression spring 260 seated between the end of the cylinder and piston forcing the piston normally in roll retracting position as shown in Figures 18 and 20. The area of piston 258 is proportionately smaller than the main actuating piston 231, and due to the bias effect of spring 260, the scoring roll piston is inoperative during advancement of the finishing head. However, when the finishing head reaches the end of its stroke with the piston seated against the end of the cylinder as indicated in broken lines in Figure 18, the back pressure developed behind the main piston is sufficient to overcome the resistance of spring 260, causing the scoring roll to move into its scoring position. The metering action restricts the admission of air sufficiently to cause the scoring roll to move slowly into the scoring position and only after the head is fully extended.

When the finishing head is retracted from the tile air presure is applied to the opposite end of cylinder 18 by way of conduit 240 and is exhausted by way of the opposite conduit 241 by operation of the reversing valve. Upon release of air pressure trapped behind the main piston 231, air pressure trapped within the scoring roll cylinder 250 is discharged rapidly through the ball check valve 255 due to the pressure exerted by the compression spring 260. This allows the scoring roller to be retracted quickly out of engagement with the surface of the tile section before the finishing head begins its axial motion in the retracting direction and thereby prevents damage to the finished surface of the tile section.

As best disclosed in Figure 20, the scoring roller 261 is mounted upon the swinging end of a lever 262 which is pivotally mounted as at 263 to a lug 264 forming a part of the casting 248. The scoring roller is pivotally mounted upon a stub shaft 265 extending from the swinging end of the lever. The lever 262 is pivotally connected as at 266 to the piston rod 267 extending outwardly from the scoring roll cylinder. The pivot points 263, 266 and 265 preferably consist of shoulder screws, each being provided with a nut 268 for example purposes.

The mandrel of the lower finishing head assembly is in the form of a pedestal 270 which enters the hub end of the tile section, as shown in broken lines in Figure 18, during the finishing operation. As indicated, the inside diameter of the bell is tapered and the pedestal moves upwardly until it engages the shoulder 16a such that the pedestal properly relates the finishing tools with reference to the plane of this shoulder. In setting up the machine, the finishing heads are brought to accurate alignment with the axis of the tile section in indexed position but it has been found in practice that the plastic clay sections sometimes are bent slightly in handling and the pedestal is found to straighten the bent sections as it enters the tapered bore at the hub end of the section. This is true also of the upper finisher, the upper mandrel being tapered to facilitate its entry and to straighten out any irregular condition.

The pedestal 270 includes a hub 271 and is rotatably journalled upon a stub shaft 273 by means of ball bearings 274. This permits the pedestal to rotate with respect to the stub shaft upon which it is mounted.

The chamfering knife 275 is mounted and rotates with the drive shaft relative to the pedestal and is arranged to form the chamfer at the shoulder 16a. The purpose of the chamfering operation is to remove the flashing which usually exists at this point by reason of the extruding operation. The chamfering knife is mounted by means of a screw 276 (Figure 20) upon a disk 277 which resides within the pedestal 270. The shank of the knife is slotted as at 278 to provide radial adjustment. The disk 277 is clamped against the inner race of the upper ball bearing 274 by means of a nut 279 threaded upon the upper end of the stub shaft 273 to provide the driving connection between the disk and stub shaft. It will be apparent therefore, that the knife and disk are rotated relative to the pedestal 270 during the finishing operation.

As best shown in Figures 20 and 21, the trimming knives 280—280 are mounted upon the outer ends of the radial arms 281—281 which extend from diametrically opposite sides of the casting 248 below the pedestal 270. These knives are thus mounted in fixed relationship with the plane of the pedestal so as to trim the hub to a predetermined length, measured from the shoulder 16a.

Each knife is mounted upon a stub shaft 282, loosely journalled in a bushing 283 pressed into a lug 284 formed at the outer ends of the radial arms 281. The outer ends of the stub shaft 282 includes a block 285 and as viewed in Figure 21, the trimming knife consists of a blade which has its cutting edge parallel with, but offset from the axis of the stub shaft. The finishing head rotates in the direction indicated by the arrow in Figure 20 such that the cutting edge trails behind the axis of the stub shaft; in addition the stub shaft is free to rock to a limited extent to provide a feathering action to provide and improve the cutting action.

As viewed in Figure 21, the feathering motion is limited by means of the cotter pin 286 passing across a flat portion 287 of the stub shaft. Upon encountering the unfinished end of the hub, the rotating knife will naturally feather slightly to a cutting position and will thereby remove the excess material progressively and without leaving an abrupt break in the finished end.

The feathering of the blade is limited on the hub end because the amount of material to be removed is relatively slight as indicated in broken lines in Figure 2. The trimming knives on the spigot end are allowed full feathering movement as disclosed in the above mentioned copending application because substantial amount of material is removed from the spigot end of the tile section.

As shown in Figure 18, the mounting bracket 212 consists of an angulated web 290, forming a part of the bearing sleeve 215 and having a mounting pad 291 formed along its upper edge. The assembly is secured to the flange 292 extending from the base of the machine, the bracket being secured to the flange by screws 293—293. In order to adjust the assembly accurately into alignment with the axis of the tile, an adjustment stud 294 is rotatably mounted in a hub 295 formed in the flange 292. The upper end of the adjustment stud is squared to provide engageemnt with a wrench and the lower end of the stud is provided with an eccentric pin 296 which fits into a bore formed in the pad. The screws 293 are screwthreaded into the pad 291 and the flange 292 includes clearance holes indicated at 297 which allow the finishing head assembly to be shifted bodily by the eccentric pin 296 when the adjustment shaft is rotated with the screws 293 slightly loosened. When proper adjustment is made, the screws are tightened to lock the assembly in final position.

As above noted, the finishing head for the spigot end of the tile section embodies a cylinder assembly 18 which is identical with that of the lower finishing head except that it is mounted in reversed position upon the cross arm 28. The end of the arm includes a flange 292 as above described, the cylinder assembly being adjustably mounted with respect to this flange in the same manner.

As shown in Figures 22 to 24, the finishing tools for the upper head are substantally the same as those of the lower head except that the scoring roller is arranged to operate upon the outside diameter of the spigot end of the tile. Also, in place of the pedestal 270 of the lower head, there is provided a centering mandrel 300 which fits the inside diameter of the spigot. The mandrel 300 is provided with a tapered portion 301 to facilitate entry into the tile and to line up the end of the tile should it be deformed in handling. The mandrel 300 is rotatably journalled upon the stub shaft 273 in the same manner as described with reference to the lower pedestal except that in this case, the disk 277 and chamfering knife 275 are omitted.

It will be noted in Figure 24 that the trimming knives 280 in the present instance, are arranged for complete feathering in the manner disclosed in the above noted copending application. For this purpose the stub shafts 282, which mount the upper trimming knives, are grooved completely as at 302 to permit complete rotation of the trimming knives as distinguished from the partial feathering provided by groove slot 287 (Figure 21) for the lower trimming knives. Complete feathering is provided for the upper knives because a greater length of material is removed from the spigot end and this allows them to descend without interference into the tile to trimming depth.

Since the scoring roll operates upon the outside diameter of the spigot section, the scoring roller must be moved inwardly into engagement with the tile section as shown in Figure 23 instead of outwardly as disclosed in Figure 20. This is accomplished in a simple manner using the identical casting 248 previously described, but in this case the fulcrum point of the lever 262 is reversed so as to reverse the direction of movement. As shown in Figure 23 the lever 262, which is used on the lower head, is replaced with a lever 303. This lever is slightly longer than the lower lever and is fulcrumed at a point intermediate its length as at 304, the piston rod being pivotally connected as at 305, with the scoring roll 306 rotatably mounted on the opposite end as at 307. It will be observed that the scoring roll 306 is cylindrical in shape to conform to the outside diameter of the tile section whereas the lower scoring roll is tapered to conform to the taper of the inside diameter of the hub.

The other parts of the cylinder assembly including the worm and worm wheel driving system, the air supply system and the passageways to the piston rod for metering air pressure to the scoring roll piston, are identical with the structure disclosed in Figure 18.

Figure 31:
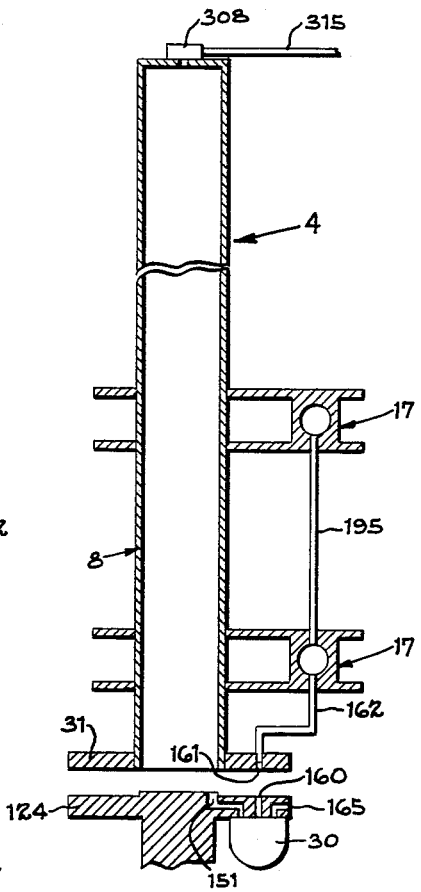
Figure 31 is a diagrammatic sectional view of the turret column illustrating its utility as an air pressure accumulator and its coupling relationship with the indexing hub whereby the air pressure is conducted from the column to the electrically operated valves and from the valves to the clamp actuating cylinders.

The air pressure conduits 240 and 241, as shown in Figure 2, extend to the respective ends of the cylinder 18 from the electrically operated valve 243 mounted upon the cross arm 28 above noted. Air pressure is supplied to this valve by way of the supply conduit 239 which branches to the column air reservoir by way of a swivel fitting 308 threaded into the closure plate 310 of the column (Figures 1, 2 and 31). The swivel fitting allows the column to rotate freely without disturbing the air supply conduit.

It will be noted in Figures 2 and 4 that air pressure is supplied to the column 8 and to the valve 243 from a terminal fitting 312 mounted upon the top of the main column 26, by way of conduit 311. Air pressure is supplied to the terminal fitting 312 by the main supply conduit 313 the air pressure passing from the terminal fitting by way of the branch conduit 311 to a T-fitting 314. From the T-fitting it passes through a flexible conduit 315 leading to the fitting 308 into the column and also to the valve conduit 239.

The terminal fitting 312 forms a part of a closure plate 316 mounted upon the upper end of the main column 26 and a closure plate includes a passageway leading to a flexible conduit 317 which extends downwardly through the column to the base of the machine as indicated in Figure 2. Conduit 317 communicates with the main supply conduit 313 and its lower end is connected to the conduit 239 leading to the control valve 242 in the base of the machine as indicated in Figure 5. Conduit 317 also supplies air pressure to the conveyor clutch valve 319 as indicated in Figure 5, the conduit 239 being extended from the valve to the clutch cylinder as later described. The air supply conduits to the various valves are shown in Figure 32, and the operation of the system is described in connection with that view. It will be observed that the upper and lower finishing head assemblies, although duplicates, will operate in reverse directions with respect to one another, by virtue of their reversed relationship. The driving system 20, previously noted, rotates both worms in the same direction, but the two assemblies, being turned end for end, rotate in opposite directions with respect to the tile section upon which they are operating. This tends to neutralize torque which would normally be transmitted to the tile section and eliminates the tendency for the tile to rotate with respect to the jaws in which it is clamped.

The drive shaft system 20 for the finishing heads is best disclosed in Figures 1 to 4 and is powered by the main driving motor 11 (Figure 7). As described earlier, this motor drives the Geneva mechanism by way of the worm shaft 50 and the worm shaft also powers the drive shaft system 20. Upon the outer end of the worm shaft there is keyed a universal joint 318 including a sleeve 320 establishing a slidable connection to a second universal joint 321. Universal joint 321 includes a shaft 322 having a keyway 323 which slidably engages a key (not shown) within the sleeve. The telescopic shaft section thus formed extends through the lower section of the base as shown in Figure 7 and the second universal joint 321 provides a driving connection with the worm shaft 219 of the lower finishing head (Figure 19). The several universal joints and the telescopic connection provided by the sleeve allows the finishing head to be adjusted with respect to the base of the machine in order to align the head assembly with the axis of the tile sections.

The drive for the upper finishing head is extended from the drive motor, as shown in Figures 2 and 3, by way of a sprocket chain drive 326 extending from the outer end of motor shaft 46, to the stub shaft 327 of a gear box 328 mounted upon the base section 33. Gear box 328 includes a pair of miter gears 330 as indicated in broken lines in Figure 2, one of the gears being mounted upon the stub shaft 327 and the other being mounted upon the lower end of a vertical drive shaft 331. The upper end of the vertical drive shaft provides a telescopic driving connection indicated at 332 with a driving sleeve 333 (Figures 1 and 2). The upper end of the drive sleeve 333 extends into a second gear box 334, similar to gear box 328, mounted upon the cross arm 28. Gear box 334 includes a pair of miter gears 330 similar to those of the lower gear box. As shown in Figure 4, the upper gear box 334 includes a stub shaft 335 which is driven by one of the miter gears and the stub shaft is connected to a cross shaft 336, by a universal joint 337 (Figure 2). Shaft 336 extends across the machine and is connected to the worm shaft 219 of the upper finishing head by a universal joint 338. The several universal joints and telescopic connection 332 permits the cross arm 28 and upper finishing head to be adjusted vertically for tile length adjustment by operation of the air motor 27.

The preliminary trimmer 210, previously noted, is best disclosed in Figures 1, 2 and 4. The trimmer occupies a position across the path of movement of the tile as it is indexed from the feed conveyor 2 to the finishing station. As noted above, the purpose of the preliminary trim is to bring the tile within the operating range of the upper finishing head. In the absence of the trimmer, a tile section of greater length than that disclosed in Figure 2, would strike the upper cutting head upon being indexed into position and would probably be made unfit for use.

Described in detail, the trimmer includes a thin wire 340, stretched tautly across the arms of an inverted U-shaped bracket 341. The bracket is mounted upon a lug 342, extending from the bearing hub 343 of the cross arm 28. A stud 344 (Figure 2) forms one arm of the U-shaped bracket, the stud having its upper end passing through lug 342 and through a forked portion 345 of the bracket 341. The upper end of the stud 344 is screw threaded and includes a nut 346 securing the parts in assembly. Bracket 341 also includes an angular finger 347 (Figure 4) extending across lug 342 and locked thereto by means of a pin 348. This angular extension or finger thus locks the assembly in its angular position. The trimming wire 340 has one end fixed as at 350 to the lower end of the stud 344 and its opposite end is fastened to the end of a screw 351 which includes a wing nut 352 to draw the wire tight similar to the adjustment of a hacksaw blade.

The thin trimming wire passes without a great deal of resistance through the advancing plastic tile, severing it cleanly in the plane of the wire and the severed portion is caused to drop by a stop rod 353 (Figures 1 and 4). This rod depends downwardly from a bracket 354 which is fastened to the outer end of the cross arm 28. The rod is located sufficiently behind the severing wire to allow the severed tile portion to be dislodged after it is completely severed but before it reaches the upper head, causing it to fall by gravity to the floor clear of the finishing station.

*Conveyor system*

The conveyor system consists of the feed conveyor 2 and the discharge conveyor 3, located respectively at the receiving and discharge sides of the turret. Both conveyor sections are driven in common by the gear head motor 21 which provides the required speed reduction, both conveyor sections being driven from the same motor by means of the chain drive 355 (Figures 1 and 3) which establishes a driving connection between the two sections. The conveyor clutch 22 is interposed in the chain drive 355 to stop the feed conveyor in response to the tripping of the starting switch arm 13 by a tile at the receiving side.

As soon as this occurs, the control system disengages clutch 22 causing the feed conveyor 2 to stop while the discharge conveyor 3 continues to operate. This prevents damage to the tile section, resting on the feed conveyor and engaged against the open jaws at the receiving side of the turret. After the conveyor stops, the turret jaws close upon the tile section and index it to the finishing station and the last finished tile section is deposited upon the moving discharge conveyor. After the turret indexes, the conveyor clutch 22 is again engaged to start feed conveyor operation so that the next tile section may be advanced to the turret.

Described in detail, the respective feed and discharge conveyors are of similar construction except that the driving motor and clutch are mounted upon the discharge conveyor assembly. Both conveyor assemblies 2 and 3 are vertically adjustable with respect to the base in order to provide adjustment for the amount to be trimmed from the hub of the tile. For this purpose the base section 34 includes dovetail ways 356—356 (Figures 1, 2 and 26), engaged by slides 357—357 secured on the cantilever mounting brackets 358. The slides 357—357 form a part of an adjustment bracket 360 secured by screws 361 to the end of the cantilever bracket (Figures 25 to 27). Since the structure is the same for both the feed and discharge conveyors, the description of the discharge conveyor applies to both.

Mounted upon the upper edge of the cantilever bracket 358 at opposite sides is a pair of channel shaped side plates 362—362 provided at opposite ends with bearings 363 for journalling the drive shaft 364 and the driven shaft 365. As best disclosed in Figures 26 and 27, the conveyor is driven by a pair of spaced sprockets 366, pinned on shaft 364, meshing with sprocket chains 367. Driven shaft 365 includes similar sprockets 368. The conveyor surface consists of a series of steel slats 370 secured by angle brackets 371 to the conveyor chains in the usual manner. The ends of the slats 370 slidably engage the surface of the side channels 362 for support, as shown in Figure 27.

The outer end of drive shaft 364 includes a drive sprocket 372 driven by a sprocket chain 373 which meshes with a sprocket wheel 374 keyed or pinned to the driving shaft 375 of the gear head motor. The motor is secured by screws 376 to the lower edges of the side plates as best shown in Figure 25. As detailed in Figures 25 and 27, the side plates are secured to the cantilever brackets 358 by means of the lugs 377 welded to the side plates and secured by screws 378 to the brackets 362.

The structure so far disclosed, constitutes a self-contained unit which is adjustable with respect to the base of the machine. For this purpose, the adjustment bracket 360, which connects the conveyor assembly to the base, is arranged to be raised and lowered with respect to the base by means of the jack screw 379 (Figure 2). The jack screw has its lower end engaged against a lug 380 extending from the base and its upper end is screw-threaded through a sleeve 381, forming a part of adjustment bracket 360.

The feed conveyor, as previously noted, determines the length to be trimmed from the hub end of the tile section and after passing from the finishing station, the finished hub must clear the surface of the discharge conveyor in order to prevent marring the finished end. For this purpose the discharge conveyor is adjusted to a position to bring its top surface slightly below the plane of the feed conveyor for clearance as indicated in Figure 1. The tile may be dropped this distance without damage when the jaws open on the discharge side to deposit it upon the conveyor surface.

The chain drive between the discharge and feed conveyors includes a sprocket 382 (Figures 3 and 26), which is mounted loosely upon the axis of driven shaft 365 and controlled by the clutch 22. This clutch is of a commercial type and is therefore not disclosed in detail. Its purpose is to control the driving engagement from shaft 365 to the sprocket 382. Both conveyors are driven in unison with the clutch engaged and the feed conveyor stops when the clutch is disengaged while the discharge conveyor continues to run.

As best disclosed in Figure 26, sprocket 382 includes a sleeve 383 passing into the housing of clutch 22. The sprocket is loosely journalled upon the shaft 365 and the clutch includes a driving element keyed to the shaft for providing the driving engagement by way of sleeve 383 to the sprocket. The clutch includes a yoke 384 and is engaged by moving the yoke inwardly and disengaged by moving the yoke outwardly.

For this purpose a lever 385 has its swinging end connected to the trunnion bearing 386 of yoke 384. The lever is pivotally mounted intermediate its length upon a pivot pin 387 secured upon an outer end of a spacer bar 388, threaded for lengthwise adjustment into a tube 390 extending crosswise of the conveyor frame. The opposite end of lever 385 is connected by screw 391 to a pull rod 392 which has its opposite end connected to the piston rod 393 of the clutch air cylinder 23. As indicated in Figure 26, the air cylinder includes a piston 394 and a pair of flexible conduits 395 and 396. These conduits extend from the clutch control valve 319 (Figure 5) mounted in the base and the valve actuates the piston in either direction to engage or disengage the clutch in response to the electrical control system.

Air pressure is supplied to the valve from the air reservoir by way of the conduit 239 above described. The electrical circuit for operating the conveyor clutch valve 319 is disclosed diagrammatically in Figure 32 and will be described in greater detail with reference to that view later.

It is to be noted at this point that by the arrangement of the conveyor drive, the discharge conveyor 3 operates continuously while the machine is in use while the feed conveyor 2, driven by way of clutch 22, is stopped immediately upon engagement by an advancing tile with the arm 13 of the starting switch to prevent damage to the tile section as it enters the clamping jaws at the receiving station.

After the jaws close upon the tile and the conveyor stops, the turret indexes, causing the jaws to shift the tile in an arc across the conveyor to the finishing station. It will be observed in Figure 3, that the steel conveyor slats 370, which form the support surface for the tiles, extend crosswise at a tangent to the arc of movement of the tile as it indexes from the conveyor. The end of the tile which rests upon the slats thus slides in a direction generally lengthwise of the slats, and therefore with the least amount of resistance and scraping. Moreover, there is deposited upon the end of the socket by the forming dies a film of oil which further lessens adherence between the wet clay and steel slats. By reason of the lateral disposition of the slats and the presence of lubricant, there is no deformation of the end of the tiles as they are shifted laterally in bearing engagement along the conveyor slats.

*Cross arm adjustment*

The vertically adjustable cross arm 28 provides a mounting for the upper finishing tool, stabilizes the upper end of the turret column and also serves as a crane for use in installing the interchangeable turrets. As best shown in Figures 2 and 28, the cross arm 28 includes a split sleeve 398 embracing the main column, the sleeve having screws 400 for establishing a frictional engagement with the column. The cross arm also includes the bearing hub 343, which rotatably embraces the turret column 8 to stabilize the turret as it executes its indexing movements. As previously noted, the upper finishing head is mounted upon the outer end of the arm and the air motor 27 is mounted on the arm for raising and lowering the arm for tile length adjustment and also for lifting the turret assembly from the machine. In the latter instance the arm serves as a crane as shown diagrammatically in Figures 29 and 30.

The arm is raised and lowered by means of a pinion 401 (Figure 28) in mesh with the teeth of a rack 402 secured to the column. The pinion 401 is keyed upon a shaft 403 journalled within a housing forming a part of the split sleeve 398. A worm wheel 404, keyed upon the end of shaft 403, is driven by a worm 405 pinned to the end of a shaft 406 journalled in a sleeve 407. Shaft 406 is connected by a coupling sleeve 408 to the shaft 410 of the air motor 27.

It will be apparent that rotation of the air motor shaft will rotate pinion 401 causing the arm to be raised or lowered with respect to the column. The air motor is of commercial construction and is not disclosed in detail. It is operated by a hand operated reversing valve 411 mounted upon a bracket 412 secured to the sleeve 398. An air supply conduit 413 supplies air pressure to the valve and conduits 414 and 415 deliver the air pressure to the motor. The valve includes an operating handle 416 for controlling the operation of the motor.

The lever is shown in its neutral or inoperative position and when it is moved from this position either upwardly or downwardly, the air pressure will be supplied to one or the other of conduits 414 or 415 to cause forward or reverse motor operation, causing the column to move in the direction of handle movement. The valve is so arranged that the air is supplied to one of the conduits and exhausted from the other alternately upon operation of the handle.

It will be apparent that the worm and worm wheel drive provides a self-locking connection adapted to hold the arm securely in adjusted position and that the gear reduction so provided produces a sufficiently slow rate of movement to allow accurate adjustment of the upper finishing head. When it is necessary to make an adjustment, the clamping screws 400 are loosened and after the adjustment has been made, the screws are tightened to lock the arm rigidly in its adjusted position.

Figure 29:
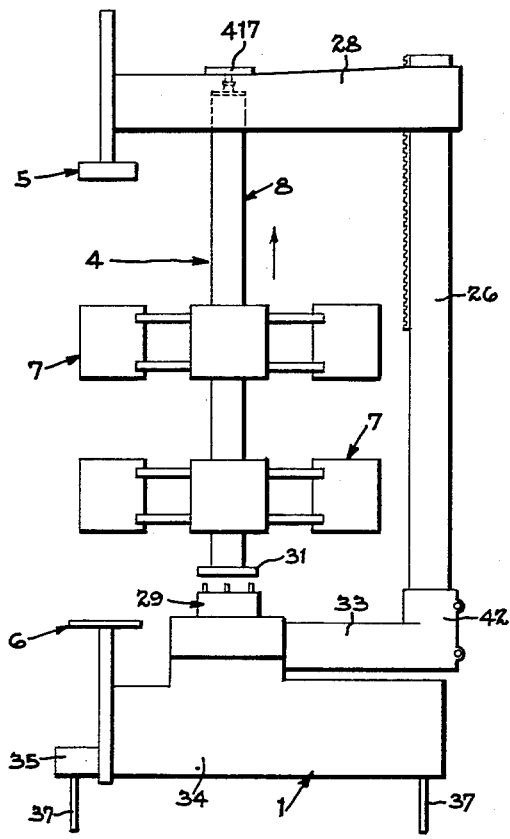
Figure 29 is a diagrammatic view showing the air motor and cross arm in use as a crane in demounting the turret assembly for replacement.
Figure 30:
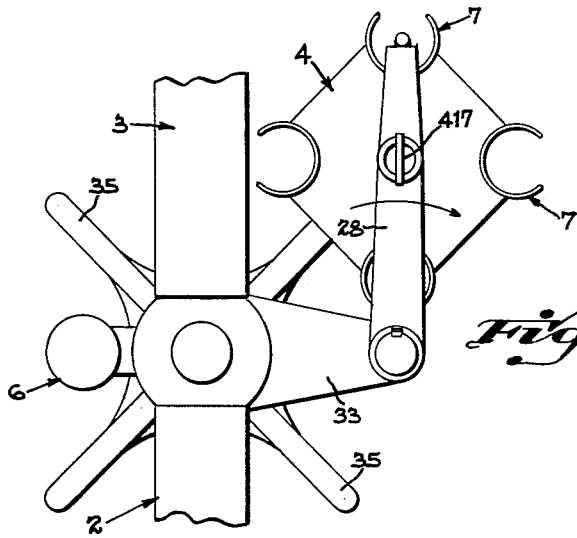
Figure 30 is a diagrammatic plan view showing the cross arm swung radially in order to lower the turret to the floor alongside the machine during replacment.

When the turret is to be replaced for a change in tile diameter, the swivel fitting 308 at the top of the column is removed and a T-shaped fixture 417 is threaded into the tapped hole as disclosed in the diagrammatic views shown in Figures 29 and 30. The nuts 32 at the base flange of the column are then removed and the arm is elevated by operation of the air motor until its bearing sleeve 343 engages the fixture 417 and lifts the turret column from the hub as shown in Figure 29.

The lower end of the main column 26 normally is clamped in position in the sleeve 42 of the base section by means of the clamp screws 418 (Figure 2). When the arm is used as a crane, these screws are loosened so as to allow the main column to be rotated upon the base with the turret assembly suspended from the arm as illustrated in Figure 30. When the column assembly is swung clear of the base, as shown, the air motor is operated in a direction to lower the arm and turret assembly upon a truck (not shown) which may be placed alongside the base. The T-shaped fitting is then removed and the air motor operated in a direction to elevate the arm 28 until it is clear of the turret column so that the turret assembly may be hauled away.

A new assembly having clamping jaws of the desired size is then moved into position alongside the base, the arm is lowered upon the turret column and the T-shaped fixture 417 is screwed into its upper end. The new column assembly is then installed by using the cross arm as a crane to hoist the assembly upon the hub. After the column is positioned upon the hub, the nuts 32 are installed, the T-shaped fixture removed and the swivel fitting 308 is replaced. The arm is then adjusted to the desired tile length, and the machine is ready for operation.

It will be noted in Figure 31 that the column, clamping jaws, jaw actuating cylinders and air lines constitute a self-contained unit, making it unnecessary to uncouple the air lines when the turret assembly is replaced. As indicated in the diagram (Figure 31), the turret column constitutes an air reservoir or accumulator for the clamping jaws. This provides quick operation of the clamping jaws and conveyor clutch when the cycle is initiated.

As disclosed in the next section, the elements of the electrical control system, which operates the valves for the several components for the machine are all disposed in the indexing hub and respond to the indexing movements of the hub as described with reference to the electrical circuit. The hub arangement is quite simple and reliable in design and in operation and eliminates a great deal of electrical wiring. The indexing hub constitutes a self-contained electrical system and the turret assembly constitutes a self-contained air system, separable from one another. Neither the air system or electrical circuit are disturbed when the turret assembly is replaced.

Control system

The electrical control system, air valves, and cylinders for controlling the several components of the machine are shown diagrammatically in Figure 32 in the position occupied at the start of a cycle. The electrically operated valves are commercial products, and are diagrammed as conventional reversing valves for simplicity, with the necessary ports and passageways to perform their functions. The column air reservoir also is omitted for the sake of simplicity; however, it will be understood that the air supply conduits, shown leading to the valves of the clamp cylinders, represent the passageways formed in the base flange of the turret column, leading from the turret to the valves. The conduits shown leading to the finishing head valves, conveyor clutch valve and single cycle clutch cylinder, represent the flexible air conduits previously described. The various contactors, brushes, conduits, valves and cylinders are designated in most instances by the same numerals previously used in the detailed description of their structure.

In the position illustrated, the turret assembly is stationary, and the timing disk 84 is illustrated in the position it assumes at the end of a cycle. Electrical energy is supplied to the main motor 11 and conveyor motor 21 by way of the three phase power lines 420 extending from the manual control switch 421, mounted on the main column 26 (Figure 2). The control circuit operates at low voltage and is energized by the low voltage transformers 422 and 423, which have their primary windings 424—424 in electrical connection with the main power lines. These transformers, windings and the motors 11 and 21 are energized when the manual switch is closed.

The electrical system is simplified by utilizing a single wire control network and completing the circuit by grounding one side of it. For this purpose, the respective terminals of the transformer secondary windings 426 are grounded as at 427 and a supply line 428 is tapped into each secondary winding at an intermediate point. The solenoid windings of the various electrically operated valves, designated in each instance at 430, are also grounded intermediately as indicated at 431. The opposite ends of these windings are adapted to be energized selectively by way of the supply lines 428 leading from the transformer secondary windings.

Each of the electrically operated valves is actuated by a two-position solenoid plunger indicated by the numeral 432. When the solenoid winding is energized from one end, the plunger and its associated valve will be shifted to a corresponding end, and when the winding is energized from the opposite end, the plunger and valve will be shifted to its second position.

When the turret is stationary, the timing disk contactor 112 will provide an open circuit from the brush 113 to the brush 114 as shown. In the turret position shown, the valve and clamping cylinders shown at station A represent those at the receiving side of the machine, those at B are at the finishing station, those at C are at the discharge station and those at D are at the idle position. It will be observed that the cylinder at B is shown in its clamping position, while those at the other stations are shown in open position corresponding to the condition of the machine before a cycle of operation is started.

When a tile advancing on the feed conveyor engages the arm 13 of starting switch 12, the normally open contacts 433 will close, thereby establishing an electrical circuit by way of supply line 428 and branch line 434, through the switch contacts to line 435. Line 435 extends to the stationary clamp closing brush 135 through line 141. In the stationary position, the clamp closing contactor 137 of the valve 30 at the receiving position A is in contact with the brush 135 by way of line 143 which represents the valve terminal previously described. A circuit is thus established to the left hand winding of the solenoid to its intermediate ground, causing the solenoid plunger 432 to be shifted toward the left.

This causes the valve plunger to shift to the left. Upon shifting to the left, air pressure will be admitted by way of air supply line 151 through the valve and by way of the conduits 162 and 195 to the clamp operating cylinders 17. This causes the clamp pistons to be moved from the positions shown to their outward position, thereby closing the column clamps. Air supply 151 represents the turret air passageway previously described with reference to Figure 12, and the conduits 162 and 195 lead from the turret flange as shown in Figure 31.

The circuit from the starting switch also is conducted by way of branch line 436 to the line 437 which extends in common to the valves 242 and 243 which control the axial movements of the upper and lower finishing heads. The circuit is also completed to the valve 319 which controls the conveyor clutch. In the position shown in the diagram, the cylinders for the cutting heads are shown extended in operating position. The valve and cylinder for the feed conveyor clutch are shown in clutch engaging position.

When the starting switch is closed, the left hand windings of these three valves are energized by way of line 437, causing the solenoid plunger 432 of each to be shifted toward the left. Moving the valve plungers to the left causes air pressure to be applied to the lower end of the upper finishing head cylinder 18 by way of conduit 240, air being exhausted by the upper end by conduit 241 through the valve to the exhaust port 438. The lower cutter head is retracted by applying air pressure to its upper end by way of conduit 240, the air being exhausted by way of conduit 241, through the valve to the exhaust port 438.

The single cycle clutch operating cylinder 25 is connected by way of the branch conduit 105 leading to the upper end of the cylinder. The flow of air is retarded by the metering valve 440 causing the operation of the clutch cylinder only after the finishing head is fully retracted.

Movement of the conveyor clutch valve 319 to the left, causes air pressure to be applied to the left hand end of the cylinder by way of line 395 and to be exhausted from the opposite end by way of line 396. This causes the clutch to disengage, thereby stopping the conveyor. It is to be noted at this point that the conveyor clutch is disengaged immediately when the starting switch is tripped and also that the clamping jaws at station A are closed immediately. By virtue of the retarded flow to the cycle clutch cylinder, the finishing heads are fully retracted before the cycle control clutch is tripped by the back pressure from the retracted lower finishing head cylinder. The metering valve 440 thus prevents the turret from indexing until the clamping jaws at station A close and the finishing heads retract fully.

After the clamping jaws at the receiving side close upon the unfinished tile and the finishing heads fully retract, the cycle control cylinder 25 will swing the release lever downwardly from the position shown in Figure 11, thus swinging the release finger 60 momentarily to release position. This couples the Geneva crank arm to the worm wheel shaft, causing the crank arm to begin its single orbit of rotation and to index the turret for one-quarter turn in the direction indicated by the arrow.

Rotation of the crank arm 55 causes the timing disk 84, which is mounted on the worm wheel shaft 50, to be rotated one full turn in the direction indicated. After the indexing movement, and with the turret stationary, the crank arm and timing disk continue to rotate through an arc of approximately 45° before the single cycle clutch ring is engaged by the finger at stopping position. During the last portion of rotation and after the turret has come to rest, the contactor segment 112, which is mounted for rotation upon the timing disk, passes across the spaced brushes 113 and 114 and momentarily completes an electrical circuit across the brushes.

This circuit extends from the line 428 of the transformers by way of line 441 to the brush 113. From the brush 114, the circuit is completed to the line 442 which is common to the windings of the valves for the finishing heads and feed conveyor clutch. Energizing line 442 thus shifts the three valves to the right, causing the finishing heads to move into operating position and the conveyor clutch to engage as shown in the diagram.

It will also be observed that line 442 branches by way of line 142 to the clamp opening brush 134 which is in contact with the clamp opening contact 136 at the discharge side of the machine. Contact 136 leads by way of terminal 144 to the valve. It will be apparent, therefore, that just before the end of the cycle, the closing of contacts will shift the valve at position C to clamp opening position, thereby causing the tile to be released upon the discharge conveyor.

The valves and their contactors are indexed with the turret column relative to the stationary brushes 134 and 135 and the clamp opening contacts 136 successively established an electrical circuit with the clamp opening brush 134 at the discharge station. At the receiving station, the clamp closing contacts 135 successively established an electrical connection with the clamp closing brush 135. It will be noted that the valves at the finishing and idling stations have their contacts out of electrical contact with the circuit. However, these valves remain respectively in the positions to which they were last shifted until they are again energized.

From the foregoing, it will be observed that the control system essentially consists of one circuit extending from the starting switch to the clamp closing contact, the valve at the receiving station and to the valves for the cutting head cylinders and feed conveyor clutch. This circuit retracts the cutting heads and stops the feed conveyor as soon as the starting switch is tripped. After the lower cutting head is fully retracted, the cycle control clutch is tripped by the cylinder 25 to initiate the indexing movement.

During indexing, the valves all remain in the position to which they were shifted by the starting switch until the turret indexing movement is complete. The valves are then reversed by way of the second circuit extending from the timing disk. This circuit momentarily energizes clamp jaw valve at the discharge station and the valves for the cutting head and feed conveyor. Thus the timing disk causes the heads to be extended and the feed clutch to be reengaged as soon as possible after the turret has indexed.

Since the clamp jaws at the finishing station B remain in clamped position the machine always stops with a tile in position for finishing. In order to clear the machine when desired, a jogging switch 444 is included in the circuit. This switch consists of a hand operated push button having normally open contacts in shunt with the starting switch. Depressing the jogging switch button will establish the same circuit as the starting switch, causing the turret to index one cycle and to discharge the last finished tile upon the discharge conveyor. It will be noted that the main power switch must be closed before the control circuit becomes energized by way of the transformers. This prevents the machine from being operated with the finishing heads stationary.

Having described my invention, I claim:

1. An apparatus for finishing plastic clay pipes comprising, a unidirectional feed conveyor arranged to convey the pipes in a horizontal path, normally open pipe clamping jaws extending radially in alignment with the conveyor to receive the pipes advanced by the conveyor, the clamping jaws being adapted to be indexed in stepwise rotary advancement in a horizontal plane, a finishing head spaced radially from the feed conveyor, a preliminary trimming device interposed in a radial position between the feed conveyor and finishing head, means responsive to the advancement of a pipe upon the conveyor adapted to close the jaws when an advancing pipe enters the open clamping jaws at the feed conveyor, means for indexing the turret and jaws with the pipe clamped therein from the feed conveyor to the finishing head, said preliminary trimming device being located in a plane suitable to trim the pipe as the same is indexed to the finishing head for finishing.

2. An apparatus for finishing plastic clay pipes during an automatic cycle of operation in response to the advancement of pipes, said apparatus comprising, a control system having a shiftable trip device interconnected therewith to energize the control system and initiate an automatic cycle of operation upon being shifted from a normal position, a unidirectional feed conveyor arranged to convey the pipes in a horizontal path, a finishing head spaced radially from the feed conveyor, normally open pipe clamping jaws adapted to be indexed in stepwise advancements in a horizontal plane from the feed conveyor to the finishing head, the trip device of the control system residing in a position relative to the feed conveyor to be shifted from said normal position by a pipe entering the open clamping jaws, means regulated by the control system for stopping the feed conveyor when the trip device is shifted, means regulated by the control system for closing the jaws upon the pipe with the pipe resting upon the feed conveyor, and means regulated by the control system for indexing the jaws with the pipe clamped therein from the feed conveyor to the finishing head for finishing.

3. An apparatus for finishing plastic clay pipes during an automatic cycle of operation in response to the advancement of pipes, said apparatus comprising, a control system having a shiftable trip device interconnected therewith to energize the control system and initiate an automatic cycle of operation upon being shifted from a normal position, a unidirectional feed conveyor arranged to convey the pipes in a horizontal path, a turret having normally open pipe clamping jaws extending radially in alignment with the conveyor to receive the pipes advanced by the conveyor, the trip device of the control system residing in a position relative to the feed conveyor to be shifted from said normal position by a pipe entering the open clamping jaws, the turret and clamping jaws being adapted to be indexed in stepwise rotary advancement in a horizontal plane, a finishing head spaced radially from the feed conveyor and adapted to be retracted and advanced relative to an end of the pipe, a horizontal discharge conveyor spaced radially from the finishing head, means regulated by the control system for stopping the feed conveyor when the trip device is shifted, means regulated by the control system for closing the jaws upon the pipe with the pipe resting upon the stationary feed conveyor, means regulated by the control system for retracting the finishing head, means regulated by the control system for indexing the turret and jaws with the pipe clamped therein from the feed conveyor to the retracted finishing head, and means regulated by the control system for extending the finishing head to the end of the pipe after the pipe is indexed to the finishing head.

4. An apparatus for finishing plastic clay pipes during an automatic cycle of operation in response to the advancement of pipes at random sequence, said apparatus comprising, a control system which is responsive to the advancement of a pipe to initiate the cycles of operation, a unidirectional feed conveyor arranged to advance the pipes in a horizontal path, a rotatable turret having a plurality of normally open pipe clamping jaws extending radially therefrom, means for indexing the turret and clamping jaws in stepwise rotary advancement in a horizontal plane, a finishing head spaced radially from the feed conveyor, a horizontal discharge conveyor spaced radially from the finishing head, a power motor in driving connection with the discharge conveyor, a second driving system connecting the discharge conveyor to the feed conveyor for driving both conveyors in the same direction, a normally engaged clutch interposed in the second driving system effective upon being disengaged to stop the feed conveyor while the discharge conveyor continues advancing, a power device connected to the clutch for disengaging the same, means regulated by the control system and connected to the power device of said clutch for disengaging the clutch and stopping the feed conveyor when a pipe enters the open jaws at the feed conveyor, means regulated by the control system for closing the jaws upon the pipe with the pipe resting upon the stationary feed conveyor, means regulated by the control system for indexing the turret and clamping jaws to the finishing head with the pipe clamped therein, and means regulated by the control system for opening the clamping jaws when the jaws are indexed from the finishing head to the discharge conveyor.

5. An apparatus for finishing plastic clay pipes comprising, a unidirectional feed conveyor arranged to convey the pipes in a horizontal path, a turret having normally open pipe clamping jaws extending radially therefrom into alignment with the feed conveyor to receive the advancing pipe, the turret and clamping jaws being adapted to be indexed in stepwise rotary advancement in a horizontal plane, a finishing head spaced radially from the feed conveyor and adapted to be retracted and advanced vertically relative to the end of the pipe, a preliminary trimming device interposed in a radial position between the feed conveyor and finishing head, means for stopping the feed conveyor when an advancing pipe enters the open clamping jaws at the feed conveyor, means for retracting the finishing head, means for indexing the turret and jaws with the pipe clamped therein from the feed conveyor to the retracted finishing head, said preliminary trimming device being mounted in the path of movement of the pipe as the same is indexed and being adapted to trim the end of the pipe to a plane related to the plane of the finishing head in retracted position, and means for extending the finishing head to a finishing plane after the turret and clamping jaws index the trimmed pipe to an operating position with respect to the finishing head.

6. An apparatus for finishing plastic clay pipes during an automatic cycle of operation in response to the advancement of pipes, said apparatus comprising, a control system which is responsive to the advancement of unfinished pipe to initiate the cycles of operation, a unidirectional feed conveyor arranged to convey the pipes in a horizontal path, a retractable finishing device spaced radially from the feed conveyor, a discharge conveyor spaced radially from the finishing device, a plurality of radial pipe clamping jaws adapted to be indexed in stepwise rotary advancements sequentially relative to the feed conveyor, finishing device and discharge conveyor, means regulated by the control system for opening and closing the jaws, said jaws being adapted to reside in open position when positioned at the feed conveyor to receive an advancing pipe, the control system including a trip device engageable by a pipe advancing upon the conveyor when the pipe enters the open jaws at the feed conveyor, means regulated by the control system adapted to stop the feed conveyor when a pipe engages the trip device, means regulated by the control system to close the jaws upon the pipe, means regulated by the control system to retract the finishing device, and means regulated by the control system responsive to the retraction of the finishing device to index the clamping jaws for one advancement and thereby to transfer the pipe from the conveyor to the finishing device.

7. A machine for finishing plastic clay pipes, comprising, a unidirectional feed conveyor arranged to convey the pipes in a horizontal path, a rotatable turret having pipe clamping jaws extending radially therefrom, normally disengaged turret driving means adapted to index the turret and jaws in single rotary stepwise advancements, a finishing device spaced radially from the feed conveyor, a discharge conveyor spaced radially from the finishing device, power means for opening and closing the jaws, said jaws being arranged to reside in open position when indexed to the feed conveyor to receive an advancing pipe, trip means engageable by a pipe advancing upon the feed conveyor for stopping the feed conveyor when a pipe enters the open jaws, means connected with the trip means operable to energize the power means in jaw closing direction when the pipe enters the open jaws, means connected with the said trip means operable to engage the turret driving means and thereby index the turret in one stepwise advancement after the jaws close upon the pipe to advance the pipe to the finishing device, and means for opening the clamping jaws when the jaws advance from the finishing device to the discharge conveyor.

8. A machine for finishing plastic clay pipes comprising, a unidirectional feed conveyor arranged to convey the pipes in a horizontal path, a rotatable turret having a plurality of pipe clamping jaws extending radially therefrom, normally disengaged turret driving means for rotating the turret and jaws in single rotary stepwise advancement in a horizontal plane, a finishing device spaced radially from the feed conveyor, a discharge conveyor spaced radially from the finishing device, said plurality of jaws being arranged to reside in alignment respectively with the feed conveyor, finishing device and discharge conveyor when the turret driving means is disengaged and thereby to advance a plurality of pipes collectively when the turret is indexed, power means for opening and closing the jaws, said jaws being arranged to reside in open position relative to the feed conveyor to receive an advancing pipe, trip means engageable by a pipe advancing upon the feed conveyor for stopping the feed conveyor when a pipe enters the open jaws, means connected with the trip means operable to energize the power means in jaw closing direction when the pipe enters the open jaws, means connected with the said trip means operable to rotate the turret in one stepwise advancement after the jaws close upon the pipe to advance a pipe from the feed conveyor to the finishing device and simultaneously advance another pipe from the finishing device to the discharge conveyor, and means for opening the clamping jaws when the jaws advance from the finishing head to the discharge conveyor to release the finished pipe.

9. An apparatus for finishing the opposite ends of a plastic clay pipe, said apparatus being adapted to engage and finish the pipes sequentially as they are advanced in vertical position, said apparatus comprising, a base, a turret mounted upon the base and adapted to be rotated in stepwise advancement, a plurality of clamping jaws extending radially from the turret, a feed conveyor mounted on the base adapted to advance the pipe to the turret in a horizontal path, finishing means spaced radially from the feed conveyor, the clamping jaws being adapted to index the pipes sequentially from the feed conveyor to the finishing means, a starting switch having an actuating member disposed above the feed conveyor in the path of movement of the pipes, driving means for the feed conveyor including a clutch interconnected with the starting switch, the starting switch being adapted to disengage the clutch when the switch actuating member is tripped by an advancing pipe, and thereby stop the feed conveyor when the pipe is seated within the clamping jaws, and turret driving means interconnected with said starting switch adapted to index the turret after the clamping jaws are engaged upon the said pipe and thereby to index the pipe to the finishing means.

10. An apparatus for trimming plastic clay pipes comprising, a base, a main column rising vertically from said base, a rotatable turret column rising vertically from said base in spaced relationship to the main column, means for indexing the turret column in stepwise rotary advancement, a cross arm extending from the main column and rotatably connected to the turret column, a finishing head mounted upon said cross arm, a unidirectional conveyor adapted to advance the pipes in a horizontal path, a plurality of clamping jaws extending radially from the turret column adapted to grip the pipe advanced by the conveyor and to align the same with the finishing head when the turret column is indexed, and means for adjusting the cross arm vertically with respect to the main column and thereby to regulate the amount of material removed from the pipe.

11. An apparatus for finishing plastic clay pipes, comprising a base, a main column rising from said base, a turret column rising from said base in spaced relationship to the main column, means for rotating the turret column in stepwise advancement, a cross arm extending from the main column and rotatably connected to the turret column, a finishing head mounted upon said cross arm, a unidirectional conveyor adapted to advance the pipes in a horizontal path, clamping jaws mounted upon the turret column adapted to engage a pipe advanced by the conveyor and to align the same with the finishing head when the turret column is rotated by said means, and power means for adjusting the cross arm vertically and finishing head with respect to the main column and thereby to regulate the amount of material removed from the pipe, said turret column being detachably mounted on said base and the cross arm being arranged to lift the turret column from the base for removing the same by detaching the turret and adjusting the cross arm upwardly.

12. An apparatus for finishing the ends of plastic tiles comprising, a base, an indexing hub rotatably mounted on said base, a plurality of stations radially spaced from one another in a horizontal plane, power means for indexing said hub in stepwise advancements, a turret column, the turret column constituting a fluid pressure reservoir, means for supplying fluid pressure to the turret column, attachment means for mounting the turret column upon said indexing hub, clamping jaws extending from the turret column, pressure operated cylinders connected to the clamping jaws for opening and closing the same, shiftable pressure control valves mounted in the indexing hub and operable upon shifting thereof to control the admission of fluid pressure from the turret column to said cylinders, and operating means in said indexing hub constructed and arranged to shift said valves in accordance with the indexing movements of the hub and thereby to open and close the clamping jaws at the respective stations in response to the indexing movements of the indexing hub.

13. An apparatus for finishing the ends of plastic tiles comprising, a base, an indexing hub rotatably mounted on said base, a plurality of stations radially spaced from one another in a horizontal plane, power means for indexing said hub in stepwise advancements, a turret column, the turret column constituting a fluid pressure reservoir, means for supplying fluid pressure to the turret column, attachment means for detachably mounting the turret column upon said indexing hub, clamping jaws extending from the turret column, pressure operated cylinders connected to the clamping jaws for opening and closing the same, shiftable pressure control valves mounted in the indexing hub and operable upon shifting thereof to control the admission of fluid pressure from the turret column to said cylinders, operating means in said indexing hub constructed and arranged to shift said valves in accordance with the indexing movements of the hub and thereby to open and close the clamping jaws at the respective stations in response to the indexing movements of the indexing hub, and a lifting device mounted on the base constructed and arranged to elevate the turret column as a unit from the indexing hub upon detachment of the said attachment means.

14. In an apparatus for trimming the lower ends of freshly formed clay pipes, a base, a pipe clamping jaw mounted upon said base and adapted to grip the pipe, said clamping jaw being movable in a horizontal plane, a conveyor adapted to transfer the pipe along a horizontal plane to said clamping jaw with the pipe resting in a vertical position upon the conveyor, the conveyor being disposed in a horizontal plane below the clamping jaw, thereby to determine the longitudinal position of the pipe with respect to the clamping jaw, a finishing head adapted to trim the lower end of the pipe with the pipe gripped by said clamping jaw, the clamping jaw being movable in said horizontal plane to transfer the pipe in the longitudinal position determined by the plane of the conveyor and to align the pipe in said position with the finishing head, the said finishing head being operable in a plane which is located above the plane of the feed conveyor to determine the amount of material trimmed from the lower end of the pipe.

15. In an apparatus for handling freshly formed clay pipes, a base, a pipe clamping jaw mounted upon said base and adapted to grip and transfer the pipe, the clamping jaw being movable laterally in a horizontal plane, a horizontal feed conveyor adapted to advance the pipe longitudinally to said clamping jaw with the pipe supported upon its end in upright position upon the feed conveyor, said pipe clamping jaw being adapted to grip the pipe and to slide the pipe laterally from the conveyor with the end of the pipe engaging the surface of the conveyor, the said conveyor having a horizontal pipe supporting run which comprises a series of slats extending crosswise to the longitudinal path of advancement of the conveyor, whereby the pipe upon being transferred from the conveyor slides with minimum resistance in a direction which is generally lengthwise of the slats.

16. In an apparatus for handling freshly formed clay pipes, a base, a pipe clamping jaw mounted upon said base and adapted to grip and transfer the pipe, the clamping jaw being movable in a circular path and in a horizontal plane, a horizontal feed conveyor adapted to advance the pipe to said clamping jaw with the pipe supported upon its end in upright position upon the feed conveyor, said pipe clamping jaw being adapted to grip the pipe and to slide the pipe in said circular path from the feed conveyor with the end of the pipe engaging the conveyor, the said conveyor having a horizontal pipe supporting run which comprises a series of slats extending crosswise to the longitudinal path of advancement of the conveyor, the said slats being related at a tangent to the circular path of movement described by the pipe as it is transferred by the clamping jaw, whereby the pipe upon being transferred from the conveyor slides with minimum resistance in a direction which is generally lengthwise of the slats.

17. In an apparatus for trimming the lower ends of freshly formed clay pipes, a base, a pipe clamping jaw mounted upon said base and adapted to grip the pipe, said clamping jaw being movable in a horizontal plane, a conveyor adapted to transfer the pipe in a horizontal plane to said clamping jaw with the pipe resting in a vertical position upon the conveyor, means for adjusting the position of the conveyor vertically with respect to the clamping jaw to regulate the longitudinal position of the pipe with respect to the clamping jaw and thereby determine the length to be trimmed from the pipe, a finishing head adapted to engage and trim the lower end of the pipe with the pipe gripped by said clamping jaw, said clamping jaw being movable in said horizontal plane to transfer the pipe in the longitudinal position determined by the conveyor and to align the pipe in said position with the finishing head, the said finishing head being operable in a plane which is located above the plane of the feed conveyor, whereby the adjusted position of the conveyor determines the amount of material trimmed from the lower end of the clay pipe.

18. In an apparatus for trimming the lower end of freshly formed clay pipes, a base, a pipe clamping jaw mounted upon said base and adapted to grip the pipe, said clamping jaw being movable in a horizontal plane, a conveyor adapted to transfer the pipe in a horizontal plane to said clamping jaw with the pipe resting in a vertical position upon the conveyor, the conveyor being disposed in a horizontal plane below the clamping jaw, thereby to determine the longitudinal position of the pipe with respect to the clamping jaw, a vertically movable finishing head adapted to engage and trim the lower end of the pipe with the pipe gripped by said clamping jaw, said clamping jaw being movable in said horizontal plane to transfer the pipe in the longitudinal position determined by the plane of the conveyor and to align the pipe in said position with the finishing head, means for moving the finishing head axially to a position retracted below the plane of the conveyor before the pipe is transferred into alignment therewith, said means being arranged to move the finishing head to a plane which is located above the plane of the conveyor after the pipe is transferred into alignment therewith and thereby trim from the lower end of the pipe an amount of material equal to the difference between the planes of the conveyor and finishing head.

19. In an apparatus for trimming the opposite ends of freshly formed clay pipes, a base, a pipe clamping jaw mounted upon said base and adapted to grip the pipe, the clamping jaw being movable in a horizontal plane, a conveyor adapted to transfer the pipe to said clamping jaw with the pipe resting in a vertical position upon the conveyor, the conveyor being in a horizontal plane below the clamping jaw, thereby to determine the longitudinal position of the pipe with respect to the clamping jaw, respective upper and lower finishing heads adapted to engage and trim the opposite ends of the pipe with the pipe gripped by said clamping jaw, said clamping jaw being movable in said horizontal plane to transfer the pipe in the longitudinal position determined by the plane of the conveyor and to align the pipe in said position with the upper and lower finishing heads, the said finishing heads being operable in respective planes above and below the plane of the conveyor whereby the plane of the conveyor regulates the amount of material trimmed from the upper and lower ends of the pipe.

20. In an apparatus for trimming the respective opposite ends of plastic clay pipes, a base, a turret rotatably mounted on said base having a plurality of pipe clamping jaws extended radially therefrom, means for rotating the turret and clamping jaws in stepwise advancements, a feed conveyor adapted to transfer the pipes to said clamping jaws, the feed conveyor being disposed in a horizontal plane below the clamping jaws, thereby to control the longitudinal position of the pipes with respect to the clamping jaws, the clamping jaws being movable in a horizontal plane in said stepwise advancement, an upper and lower finishing head mounted in axial alignment with one another and located in a position to trim the ends of the pipe when the same is indexed by said jaws from the feed conveyor, said upper and lower finishing heads being movable axially from a retracted to an extended trimming position and having a fixed finishing plane, means for adjusting the upper finishing head vertically to control the trimming plane thereof and thereby to control the amount of material trimmed from the upper end of the pipe, and means for adjusting the feed conveyor vertically and thereby to control the amount of material trimmed from the lower end of the pipe.

21. In an apparatus for trimming the opposite ends of freshly formed clay pipes, a base, a pipe clamping jaw mounted upon said base and adapted to grip the pipe, the clamping jaw being movable in a horizontal plane, a feed conveyor adapted to transfer the pipe in a horizontal path to said clamping jaw with the pipe resting in a vertical position upon the conveyor, the feed conveyor being disposed in a horizontal plane below the clamping jaw, thereby to determine the longitudinal position of the pipe with respect to the clamping jaw, respective upper and lower finishing heads aligned axially with one another and adapted to engage and trim the opposite ends of the pipe with the pipe gripped by said clamping jaw, said clamping jaw being movable in said horizontal plane to transfer the pipe in the longitudinal position determined by the plane of the feed conveyor and to align the pipe axially with the upper and lower finishing heads, a preliminary trimming device located radially between the feed conveyor and finishing heads in a plane to intercept and trim the upper end of the pipe as the same is transferred to the finishing heads, and means for moving both of said finishing heads axially to positions retracted beyond the ends of the pipe before the pipe is transferred into alignment therewith, said means being arranged to move both of the finishing heads axially into finishing positions after the trimmed pipe is transferred into alignment therewith.

22. In an apparatus for trimming plastic clay pipes, a base, a vertical turret column rotatably mounted on the base, a pipe clamping jaw mounted on the turret column and adapted to rotate in unison with the turret column in a horizontal plane, a horizontal feed conveyor mounted on the base at an elevation related to the horizontal plane of the clamping jaw, means for indexing the turret column and jaw in stepwise rotary advancements, a finishing head adapted to trim the end of the pipe as it is advanced by said jaw from the feed conveyor, means for retracting the finishing head beyond the end of the pipe before the turret and clamping jaw are indexed and for extending the finishing head to a trimming plane after the turret is indexed, and a preliminary trimming device located at a plane corresponding to the trimming plane of the trimming head when the same is in retracted position, said trimming device being located radially between the feed conveyor and finishing head and adapted to trim excess material from the pipe as the same is indexed from the feed conveyor to the finishing head, whereby the preliminarily trimmed end of the pipe corresponds to the horizontal plane of the trimming head when the same is retracted to provide clearance, the trimming head being adapted to trim an additional amount of material from the end of the pipe when the trimming head is extended to said trimming plane.

23. In an apparatus for finishing the ends of plastic tiles, a rotatable turret column constituting a fluid pressure reservoir, means for supplying that fluid pressure to the turret column, clamping jaws extending from the turret column, pressure operated devices connected to the clamping jaws for opening and closing the same, and shiftable pressure control valves operable to control the admission of fluid pressure from the turret column to said pressure operated devices and thereby open and close the clamping jaws.

24. In an apparatus for finishing the ends of plastic clay pipes, a plurality of stations radially spaced from one another in a horizontal plane, a turret column, means for indexing said column in stepwise rotary advancements, clamping jaws extending radially from the turret column, pressure operated cylinders connected to the clamping jaws for opening and closing the same, a source of fluid pressure, shiftable pressure control valves adapted to control the admission of fluid pressure to said cylinders, and operating means adapted to shift said valves in accordance with the indexing movements of the turret column relative to said stations and thereby to open and close the clamping jaws at the respective stations in response to the indexing movements of the turret.

25. In an apparatus for finishing the ends of plastic clay pipes, a base, a plurality of stations radially spaced from one another about said base in a horizontal plane, an indexing hub rotatably mounted on said base, power means for rotating said hub in stepwise rotary advancements, a turret column, means for detachably mounting the turret column upon said indexing hub, clamping jaws adapted to engage a given size pipe extending radially from the turret column and adapted to be indexed in a horizontal plane with respect to said stations, pressure operated cylinders connected to the clamping jaws for opening and closing the same, a source of fluid pressure, shiftable pressure control valves mounted in the indexing hub and operable to control the admission of fluid pressure to said pressure operated cylinders, and means in said indexing hub constructed and arranged to shift said valve in accordance with the indexing movements of the hub, turret and clamping jaws relative to said stations and thereby to open and close the clamping jaws at the respective stations in response to the indexing movements of the indexing hub, said turret having self-contained fluid pressure conduits extending from the cylinders and adapted to interconnect with said valves when the turret is mounted upon the indexing hub, whereby interchangeable turrets having clamping jaws for various pipe sizes and duplicate fluid pressure conduits may be mounted interchangeably upon the indexing hub and in communication with said valves by way of the self-contained fluid pressure conduits.

26. In an apparatus for finishing the ends of a plastic clay pipe, a base, an indexing hub mounted on the base, means for indexing the indexing hub in stepwise rotary advancement, a turret assembly including a plurality of pipe clamping jaws extending radially therefrom, said jaws being adapted to engage a pipe of a given diameter, means for detachably mounting the turret assembly upon said indexing hub, an upper and lower finishing head, mounting means for said finishing heads, and lifting means associated with the assembly adapted to raise the turret assembly from the indexing hub upon detachment of the turret assembly, said lifting means being arranged to swing the turret assembly radially and to lower the same to a position adjacent the base for installing upon the indexing hub an interchangeable turret assembly having clamping jaws adapted to engage a pipe of different diameter and thereby to adapt the machine to the finishing of pipes of various diameters.

27. In an apparatus for finishing plastic clay pipes, said apparatus including a base, a pipe indexing turret mounted on said base and including pipe clamps, means for actuating the clamps and indexing said turret comprising, a Geneva mechanism including a rotatable crank arm adapted to provide an indexing movement upon one rotation of the crank arm, a driving system including a single cycle clutch for rotating the crank arm, a shiftable clutch release mechanism associated with the single cycle clutch adapted to engage the clutch and provide one indexing movement upon shifting thereof, a control system including means for actuating said clamps, said control system having time delay means for shifting said clutch release mechanism to clutch engaging position after the clamps are actuated.

28. In an apparatus for finishing the ends of plastic clay pipes, said apparatus including a base, a pipe indexing turret mounted on said base and including pipe clamps, axially shiftable finishing heads adapted to finish the pipes as the same are aligned therewith by said turret, means for indexing said turret and shifting the finishing heads comprising, a motor, a driving system connected to said motor and arranged to index the turret, a single cycle clutch interposed in said driving system, a shiftable clutch release mechanism associated with the single cycle clutch adapted to engage the clutch and provide one turret indexing movement upon shifting thereof, a control system including means for retracting and extending said finishing heads axially with respect to the plastic pipes as the same are indexed to the finishing heads, said control system having means for shifting said clutch release mechanism to clutch engaging position and thereby to engage the single cycle clutch after the upper and lower finishing heads are in retracted position to provide a turret indexing movement when the finishing heads are retracted.

29. In an apparatus for finishing plastic clay pipes, said apparatus including a base, a pipe indexing turret mounted on said base and including a plurality of power operated pipe clamps, means for closing the clamps at the receiving side of the apparatus, opening the clamps at the discharge side, and for indexing said turret comprising, a Geneva mechanism including a rotatable crank arm adapted to provide an indexing movement upon one rotation of the crank arm, a driving system including a single cycle clutch for rotating the crank arm, the single cycle clutch being adapted to provide one indexing movement upon tripping thereof, electrical contacts adapted to close the power operated clamps at the receiving side in response to the advancement of a pipe into the clamp, time delay means arranged to trip the single cycle clutch after the said clamp is closed, and a timing device including electrical contacts associated with the said crank arm, said contacts being arranged to open the pipe clamps at the discharge side after the turret is indexed.

30. In an apparatus for finishing the ends of plastic tiles, said apparatus including a base, a pipe indexing turret mounted on said base, the turret including a plurality of power operated pipe clamps, a power operated feed conveyor adapted to transfer the pipes to the pipe clamps, and a discharge station, cycle control means for controlling the apparatus comprising, a Geneva mechanism including a rotatable crank arm adapted to provide an indexing movement upon one rotation of the crank arm, a driving system including a single cycle clutch for rotating the crank arm, the single cycle clutch being adapted to provide one indexing movement upon tripping thereof, electrical contacts adapted to stop the feed conveyor and close the clamps at the feed conveyor in response to the advancement of a pipe into the clamp, time delay means arranged to trip the single cycle clutch after said clamp is closed and thereby to provide the indexing movement of the turret, and a timing device including electrical contacts associated with said crank arm, said contacts being arranged to open the clamp at the discharge station and start the feed conveyor after the turret is indexed.

31. In an apparatus for finishing plastic clay pipes, said apparatus including a base, a pipe indexing turret mounted on said base and including pipe clamps, an axially shiftable finishing head adapted to finish the pipes as the same are aligned therewith by said turret, fluid means for shifting the finishing head axially into retracted and extended positions, means for indexing said turret and shifting the finishing head axially comprising, a motor, a driving system connected to said motor and arranged to index the turret, a single cycle clutch interposed in said driving system, a fluid operated shiftable clutch release mechanism associated with the single cycle clutch adapted to engage the clutch and provide one turret indexing movement upon shifting thereof, a control system having means for applying fluid pressure to the fluid means of the finishing head to shift the same to retracted position, a fluid pressure conduit connected to the fluid pressure means of the finishing head, said conduit being arranged to apply fluid pressure to the fluid pressure operated shiftable means of the single cycle clutch after the finishing head is retracted for shifting said clutch release mechanism to clutch engaging position and engage the single cycle clutch after the finishing head is in retracted position and thereby provide a turret indexing movement.

32. In an apparatus for finishing plastic clay pipes, said apparatus including a base, a pipe indexing turret mounted on said base and including fluid pressure operated pipe clamps, a Geneva mechanism including a rotatable crank arm adapted to provide turret indexing movements upon one rotation of the crank arm, a driving system including a single cycle clutch for rotating the crank arm, a fluid operated shiftable clutch release mechanism associated with the single cycle clutch adapted to engage the clutch and provide one indexing movement upon shifting thereof, a feed conveyor including a fluid operated clutch for starting and stopping the same, a finishing head including fluid operated means for retracting and extending the same, a conduit extending from the fluid operated means of the finishing head to the fluid operated shiftable clutch release mechanism adapted to engage the single cycle clutch when the finishing head is retracted, a control system including means for applying fluid pressure to said fluid operated pipe clamps for closing the clamp at the feed conveyor for applying fluid pressure to the fluid operated clutch of the feed conveyor for stopping the feed conveyor when an advancing pipe enters the clamp, and for applying fluid pressure to the fluid operated means for retracting the finishing head, whereby the feed conveyor is stopped, the clamp closes upon a pipe, and the finishing head retracts before the turret and clamp indexes from the feed conveyor to the finishing head.

33. In a sewer pipe machine, a base, an indexing hub mounted upon said base, a pipe receiving and discharge station radially spaced with respect to the base, a turret column mounted upon the indexing hub and rotatable in stepwise advancement relative to said stations, said turret column constituting an air pressure accumulator, a plurality of air operated pipe clamps extending radially from the turret, a plurality of shiftable electrically operated valves mounted in said indexing hub for stepwise advancement therewith, each valve being in connection with a respective air operated pipe clamp, respective air passageways extending from the interior of the column to said electrically operated valves, said valves being operable to apply and exhaust air pressure to and from said air operated pipe clamps for closing and opening the same, a stationary clamp closing brush adapted to energize to closed position the electrically operated valve which is connected to the clamp at the receiving station, and a stationary clamp opening brush adapted to energize and shift to open position the valve which is connected to the clamp at the discharge station, said stationary contacts being operable to close and open the clamps sequentially in response to the indexing movements of the indexing hub and turret relative to the said receiving and discharge station.

34. In a sewer pipe machine, a base, an indexing hub mounted upon said base, a pipe receiving station, a turret column mounted upon the indexing hub and rotatable in stepwise advancements relative to said station, a plurality of fluid operated pipe clamps extending radially from the turret, a plurality of shiftable electrically operated valves mounted in said indexing hub for stepwise advancement therewith, each valve being in fluid connection with a respective fluid operated pipe clamp, a source of fluid pressure extending to said valves, said valves being operable to apply and exhaust fluid pressure to and from said pipe clamps for closing and opening the same, and a stationary clamp closing brush adapted to energize and shift to clamp closing position the valve which is connected to the clamp at the receiving station, said stationary brush being operable to close the clamps sequentially in response to the indexing movements of the indexing hub and turret relative to the said receiving station.

35. In a sewer pipe machine, a base, an indexing hub mounted upon said base, a respective pipe receiving and discharge station radially spaced with respect to the base, a turret column mounted upon the indexing hub and rotatable in stepwise advancements relative to said stations, a plurality of fluid operated pipe clamps extending radially from the turret, a plurality of shiftable electrically operated valves mounted in said indexing hub for stepwise advancement therewith, each valve being in fluid connection with a respective fluid operated clamp, a source of fluid pressure extending to said valves, said valves being operable to apply and exhaust fluid pressure to and from said pipe clamps for closing and opening the same, a stationary clamp closing brush adapted to energize and shift to closed position the valve which is connected to the clamp at the receiving station, and a stationary clamp opening brush adapted to energize and shift to open position the valve which is connected to the clamp at the discharge station, said stationary contacts being operable to close and open the clamps sequentially in response to the indexing movements of the indexing hub and turret relative to the said receiving and discharge station.

36. In a sewer pipe machine, said machine including a pipe indexing turret having pipe clamps, and a finishing head having an air cylinder for retracting the same, cycle control means for controlling the apparatus comprising, a mechanism including a rotatable crank arm adapted to provide a turret indexing movement upon each complete rotation of the crank arm, a driving system including an air tripped single cycle clutch for rotating the crank arm, the single cycle clutch being adapted to provide one indexing movement upon tripping thereof, an electrical system having an electrically operated air valve, said valve being connected to the air cylinder of the finishing head for retracting the finishing head when a pipe enters the clamp at the conveyor, and an air conduit extending from the finishing head cylinder to the single cycle clutch adapted to trip the clutch and provide an indexing movement after the finishing head is retracted.

37. In a sewer pipe machine, said machine including a pipe indexing turret having air operated pipe clamps, a power operated feed conveyor having an air operated clutch, and a finishing head having an air cylinder for retracting the same, cycle control means for controlling the machine comprising, a mechanism including a rotatable crank arm adapted to provide a turret indexing movement upon each complete rotation of the crank arm, a driving system including an air tripped single cycle clutch for rotating the crank arm, the single cycle clutch being adapted to provide one indexing movement upon tripping thereof, an electrical system having a plurality of electrically operated air valves, said valves being connected respectively to the air operated pipe clamps, the air operated clutch of the feed conveyor, and the air cylinder of the finishing head, the valves being arranged to disengage the feed conveyor clutch, close the clamp at the conveyor and retract the finishing head when a pipe enters the clamp at the conveyor, and an air conduit extending from the finishing head cylinder to the air controlled single cycle clutch adapted to trip the clutch and provide an indexing movement after the finishing head is retracted.

38. In a sewer pipe machine, said machine including a pipe receiving and a discharge station, a pipe indexing turret including air operated pipe clamps, the pipe indexing turret being adapted to be rotated in stepwise advancements relative to the receiving and discharge stations, a control system for controlling the cycles of operation comprising, a mechanism including a rotatable crank arm adapted to provide a turret indexing movement upon one full rotation of the crank arm, a driving system including an air tripped single cycle clutch for rotating the crank arm, the single cycle clutch being adapted to provide one indexing movement upon tripping thereof, an electrical circuit including a plurality of shiftable two-position electrically operated valves connected to the pipe clamps at the receiving and discharge stations respectively, said valves having clamp opening and closing contacts and being mounted for stepwise advancement with said turret, a respective stationary closing and opening brush for contacting and energizing the valve closing and opening contacts at the receiving and discharge stations, a starting switch in said electrical circuit adapted to initiate a cycle of operation and being connected to the closing brush whereby the valve at the receiving station closes the clamp at that station, time delay means arranged to trip the single cycle clutch after the said clamp is closed, and a timing device including electrical contacts associated with the said crank arm, said contacts being connected to the opening brush, whereby the clamp at the discharge station is opened after the turret is indexed.

39. In a sewer pipe machine, said machine including a pipe receiving and a discharge station, a pipe indexing turret, the pipe indexing turret being adapted to be rotated in stepwise advancements relative to the receiving and discharge stations, a control system for controlling the cycles of operation comprising, a mechanism including a rotatable crank arm adapted to provide a turret indexing movement upon one full rotation of the crank arm, a driving system including a single cycle clutch for rotating the crank arm, an air cylinder for tripping the clutch, the single cycle clutch being adapted to provide one indexing movement upon tripping thereof, a finishing head having an air cylinder for retracting and extending the same, a shiftable electrically operated valve connected to the finishing head air cylinder for retracting and extending the finishing head, an electrical circuit including a starting switch adapted to initiate a cycle of operation, the starting switch being connected to the electrically operated valve and adapted to energize and shift the same to a position for retracting the finishing head, an air supply conduit extending from the finishing head cylinder to the air cylinder of the single cycle clutch arranged to trip the single cycle clutch after the finishing head is retracted, and a timing device including electrical contacts associated with the said crank arm, said contacts being connected to the electrically operated valve and arranged to energize and shift the valve to a position to extend the finishing head after the turret is indexed.

References Cited in the file of this patent

UNITED STATES PATENTS

| | | |
|---|---|---|
| 1,092,106 | Holt | Mar. 31, 1914 |
| 2,386,341 | Pearne et al. | Oct. 9, 1945 |
| 2,541,570 | Booth | Feb. 13, 1951 |
| 2,555,227 | Emerson | May 29, 1951 |